United States Patent
Rostron et al.

(10) Patent No.: US 6,750,563 B2
(45) Date of Patent: Jun. 15, 2004

(54) VOLTAGE SAG AND OVER-VOLTAGE COMPENSATION DEVICE WITH PULSE-WIDTH MODULATED TRANSFORMER

(75) Inventors: Joseph R. Rostron, McDonough, GA (US); Dong-Myung Lee, Dunwoody, GA (US)

(73) Assignee: SSI Power LLC, Hampton, GA (US)

( * ) Notice: Subject to any disclaimer, the term of this patent is extended or adjusted under 35 U.S.C. 154(b) by 0 days.

(21) Appl. No.: 10/317,867

(22) Filed: Dec. 12, 2002

(65) Prior Publication Data

US 2003/0111910 A1 Jun. 19, 2003

Related U.S. Application Data

(63) Continuation-in-part of application No. 10/091,866, filed on Mar. 6, 2002, now Pat. No. 6,559,562.
(60) Provisional application No. 60/340,194, filed on Dec. 14, 2001.

(51) Int. Cl.[7] .................................................. H02J 1/00
(52) U.S. Cl. ....................... 307/103; 307/130; 361/91.7
(58) Field of Search ............................... 307/103, 130, 307/85, 87, 125, 129; 361/91.7, 90; 323/255, 341, 343, 209; 327/556, 557

(56) References Cited

U.S. PATENT DOCUMENTS

| 4,099,099 A | 7/1978 | Grudelbach |
| 4,713,619 A | 12/1987 | Busso et al. |
| 6,218,744 B1 * | 4/2001 | Zahrte et al. ................. 307/64 |

FOREIGN PATENT DOCUMENTS

EP  94108967.4  2/1996

OTHER PUBLICATIONS

Karady, George G. Parihar Pramod. "Integrated PWM and Transformer Switching Technique for AC Voltage Regulation" Arizona State University . . . IEEE (1994). pp 961–967.

* cited by examiner

*Primary Examiner*—Shawn Riley
(74) *Attorney, Agent, or Firm*—Michael J. Mehrman; Mehrman Law Office PC

(57) ABSTRACT

A voltage sag and over-voltage compensation device for an AC electric power distribution system employing cascaded switching devices and a pulse-width modulated transformer. Each stage of the cascaded switching device includes a switching element located within a full-bridge rectifier circuit to allow bi-directional switching through each switching element (i.e., switching through the same switching element during the positive and negative portions of the AC voltage cycle). Each full-bridge rectifier also includes a snubber circuit connected in parallel with a corresponding switching element to absorb the current discharge caused by switching the input power supply to the transformer through the corresponding switching device under non-zero current conditions. On the output side, the voltage sag and over-voltage compensation device includes a filter capacitor to smooth the voltage-corrected AC power supply toward a sinusoidal power supply at the system frequency, and a notch filter to remove noise created by the switching elements.

32 Claims, 28 Drawing Sheets

VOLTAGE SAG AND OVER-VOLTAGE COMPENSATION DEVICE WITH PULSE-WIDTH MODULATED TRANSFORMER

REFERENCE TO RELATED APPLICTIONS

This application claim priority to commonly owned U.S. Provisional Patent Application Serial No. 60/340,194, filed Dec. 14, 2001, entitled "Sag Supporter For Eliminating Voltage Sags By Using Multiple Transformer Taps And PWM Inverter On AC Voltage," and is a continuation-in-part of U.S. patent application Ser. No. 10/091,866 filed Mar. 6, 2002 now U.S. Pat. No. 6,559,562.

TECHNICAL FIELD

The present invention relates generally to the field of electric distribution power systems and, more particularly, relates to a voltage sag and over-voltage compensation device for an AC electric power distribution system employing a pulse-width modulated transformer.

BACKGROUND OF THE INVENTION

Voltage sags and over-voltage conditions occasionally occur on AC power distribution systems for a variety of reasons, such as high resistance faults in the distribution system, fault clearing, switching large loads characterized by arcing during connection or disconnection of the load, other types of transient circuit overloading (e.g., dynamic disturbances), high load inductance during unusually heaving load periods, and line capacitance during unusually light load periods. Although these voltage conditions may be short lived, such as a few cycles in a 50 or 60 Hertz electric power system for transient disturbances and fault clearing events, they can nonetheless cause sensitive loads, such as computer systems and manufacturing operations, to experience equipment damage and, in some cases, to drop off line. Therefore, devices that compensate for these voltage sags and over-voltage conditions, so that the loads receive an uninterrupted supply of the intended line voltage, serve an important function for these types of sensitive loads.

Certain conventional approaches to AC voltage compensation use traditional inverter technology, which rectifies the AC line power into DC power and stores the DC energy, typically in capacitors, batteries, or a flywheel during normal system operations. Then, during a voltage sag, the sag supporter device inverts the stored DC energy into AC power and delivers this power through a series-connected transformer to supply the missing voltage. This conventional inverter approach is complex and requires a large number of power switching elements to create the replacement voltage profile. The switching elements are relatively expensive and render the sag supporter financially infeasible for many applications. In addition, the duration of the available voltage support is limited by the amount of energy that can be stored prior to the voltage sag, and can therefore require large storage devices. Large storage devices can significantly increase the size of the device, often making pole-mounted configurations impractical. Alternatively, the circuitry required to repeatedly discharge and charge capacitors during the voltage sag condition presents complex control and timing challenges associated with continually recharging the capacitors to the proper level, and further increases the cost and sophistication of the device. In addition, the presence of the series-connected transformer in the power line during normal circuit operation causes significant power losses, even when voltage support is not required.

In another conventional approach, a tap switching series-connected transformer, often called a voltage regulator, may be used to compensate for voltage sag conditions. However, the large number of windings and switching elements required to provide a range of voltage sag compensation increases the cost of the voltage regulator and, in any event, limits the device to providing a discrete number of voltage steps in the output power supply. In addition, due the implementation time required for tap-changing voltage correction, these systems are ill suited to following fast changing voltage sag or over-voltage events, which typically occur when the cause of the voltage sag or over-voltage event involves a fault or switching event characterized by arcing. Arcing, by it's very nature, is erratic in behavior and changes quickly during the event as attachment points move around. Again with this type of device, the presence of a series-connected transformer in the power line during normal operations causes significant power losses.

Transient over-voltage conditions caused by the tap switching series-connected transformer presents another significant disadvantage of the tap-switching voltage regulator approach. This typically occurs when a breaker or fuse clears a fault causing the voltage sag, which abruptly returns the system to normal voltage. This typically occurs at a zero-current condition, which is followed by the series-connected transformer boosting the voltage on its output well above its normal level for approximately 8 milliseconds until the transformer can be returned to its normal setting, which usually occurs at the next zero-current condition. This "current-zero switching" limitation occurs with these devices because they typically employ thyristor switching elements, which can only switch during zero-current conditions. Thus, notwithstanding multiple winding ratios and multiple switching elements, these systems still impose a significant over-voltage on the load at the conclusion of many voltage sag events.

Therefore, there is a need in the art for a compact, cost effective voltage sag and over-voltage compensation device that does not routinely impose over-voltage conditions on the loads they are designed to protect. There is also a need for a voltage sag and over-voltage compensation device that does not require a large number of switching devices, large power storage devices, or a series-connected transformer in the power line during normal operation of the circuit.

SUMMARY OF THE INVENTION

The present invention meets the needs described above in a voltage sag and over-voltage compensation device employing a pulse-width modulated transformer, which may be an autotransformer or a step-up transformer, such as a two-winding transformer. In various embodiments of the present invention, the modulating switch may be connected in series with the transformer, or the modulating switch may be connected in parallel with one winding of the transformer. All of these configurations may be operated in different modes to accomplish the objectives of the invention. In addition, the device preferably operates at AC electric power distribution system voltages, but may be designed to operate at other voltage levels.

The voltage sag and over-voltage compensation device employing a pulse-width modulated transformer significantly improves over conventional inverter technology in that no energy storage devices are required. The present invention also significantly improves over conventional tap-switching transformer technology in that no over-voltage is imposed on the load when a voltage sag event is over. Moreover, the technology of the present invention is much simpler than prior approaches for AC voltage compensation in that it reduces the number of active switching elements and uses well developed transformer technology as the basic design element. This advantageously allows switching to occur at higher voltages with lower currents than occurs in prior designs. In addition, a single switching frequency with a single pulse-width for any given voltage sag or over-voltage condition makes the control system for the present invention relatively simple to design and implement. The end result is a comparatively uncomplicated design, which exhibits lower cost and higher reliability, while providing equivalent or improved functionality in comparison to prior art voltage compensation technologies.

Generally described, the present invention includes a voltage sag and over-voltage compensation device that receives electric power from an AC power source oscillating at a system frequency, adjusts the voltage of the power, and delivers a corresponding voltage-corrected AC power supply to a connected load. The voltage sag and over-voltage compensation device includes a transformer and a modulating switch operable between an open configuration and a closed configuration for selectively connecting the AC power source to the transformer. The device also includes a control unit for selectively gating the modulating switch between the open configuration and the closed configuration multiple times per cycle of the system frequency to generate the voltage-corrected AC power supply for delivery to the load.

The modulating switch is typically located within a full-bridge rectifier circuit connected between the AC power source and the center pole to allow bi-directional switching through a single switching element (i.e., switching through the same element during the positive and negative portions of the AC voltage cycle). The voltage sag and over-voltage compensation device also typically includes a snubber connected in parallel with the modulating switch to absorb the current discharge caused by switching the power supply to the transformer under non-zero current conditions. In particular, the modulating switch and the snubber are typically connected in parallel and located within the full-bridge rectifier circuit connected between the AC power source and the center pole.

For relatively high voltage applications, the modulating switch includes a cascade of individual switching devices connected in series and operated substantially simultaneously, typically from a common gating signal. In this case, each individual switching device is located within an individual full-bridge rectifier circuit, and a plurality of snubber circuits may each be connected in parallel with one of the individual switching devices within its corresponding full-bridge rectifier circuit. The snubber circuits may include a resistor and a capacitor connected in series and a diode connected in parallel with the resistor. Alternatively, the snubber circuits may include a resistor and a capacitor connected in series without a diode connected in parallel with the resistor.

To smooth the voltage-corrected AC power supply toward a sinusoidal power supply at the system frequency, the voltage sag and over-voltage compensation device also includes a filter capacitor connected between the neutral and upper poles of the transformer. The control unit typically gates the modulating switch at a gating frequency, and to remove noise created by the switching elements, the voltage sag and over-voltage compensation device typically includes a notch filter connected between the neutral and upper poles or the transformer. This notch filter is preferably configured to reduce power disturbances occurring in the voltage-corrected AC power supply within a filter frequency range about the gating frequency. Specifically, the notch filter may include an inductor, a resistor, and a capacitor connected in series.

To permit normal operation of the power circuit without having the transformer connected in series in the power line, the voltage sag and over-voltage compensation device typically includes an upper-pole switch for selectively connecting the AC power source between the neutral and upper poles of the transformer when the upper-pole switch is gated to a closed or "on" configuration, and for selectively disconnecting the AC power source from connection between the neutral and upper poles when the upper-pole switch is gated to an open or "off" configuration. To absorb the current discharge caused by switching the power supply to the transformer under non-zero current conditions, the voltage sag and over-voltage compensation device typically an upper-pole snubber connected in parallel with the upper-pole switch. For relatively high voltage applications, the upper-pole switch may include a cascade of individual: upper-pole switching devices connected in series and operated substantially simultaneously, typically from a common gating signal. In this case, each individual upper-pole switching device may be located within an individual full-bridge rectifier circuit, and a plurality of upper-pole snubber circuits may each be connected in parallel with one of the individual switching devices within its corresponding full-bridge rectifier circuit. Each upper-pole snubber circuit may include a resistor and a capacitor connected in series and a diode connected in parallel with the resistor.

In a first mode of operation, the control unit gates the upper-pole and switching devices in substantial unison to maintain these switches in opposing configurations. That is, the upper-pole switch is gated off when the modulating switch is gated on, and vice versa. More specifically, the control unit detects a voltage sag or over-voltage condition in the AC power source, and in response to detecting this condition, the control unit continually gates the upper-pole and switching devices in substantial unison to maintain these switches in opposing configurations to create a desired voltage-corrected AC power supply. The control unit then detects a cessation of the voltage sag or over-voltage condition in the AC power source, and in response to detecting the cessation of the condition, gates the switching device to an open configuration, gates the upper-pole switching device to a closed configuration, and discontinues further gating of the switching device.

In a second mode of operation, the control unit detects a voltage sag or over-voltage condition in the AC power source, and in response to detecting this condition, gates the upper-pole switching device to an open (i.e., by-pass) configuration. In this case, while the upper-pole switching device is held in the open (i.e., by-pass) configuration, the control unit continually gates the switching device between the open and closed configurations to create a desired voltage-corrected AC power supply. The control unit then detects a cessation of the voltage sag or over-voltage condition in the AC power source, and in response to detecting the cessation of the condition, gates the switching device to an open configuration, gates the upper-pole switching device to a closed configuration, and discontinues further gating of the switching device.

In view of the foregoing, it will be appreciated that the voltage sag and over-voltage compensation device of the present invention is a comparatively uncomplicated design, which exhibits lower cost and higher reliability, while providing equivalent or improved functionality in comparison to prior art technologies. The present invention also improves over prior AC voltage compensation technology in that no energy storage devices are required, and no over-voltage is imposed on the load at the conclusion of a voltage sag or event. The specific techniques and structures employed by the invention to improve over the drawbacks of the prior voltage sag and over-voltage compensation devices, and to accomplish the advantages described above will become apparent from the following detailed description of the embodiments of the invention and the appended drawings and claims.

DETAILED DESCRIPTION OF THE PREFERRED EMBODIMENTS

The present invention may be embodied in a voltage sag and over-voltage compensation device for an AC electric power distribution system employing cascaded switching devices and a pulse-width modulated transformer. In various embodiments of the present invention, the modulating switch may be connected in series with the transformer, or the modulating switch may be connected in parallel with one winding of the transformer, as described in co-pending U.S. patent application Ser. No. 10/091,866 now U.S. Pat. No. 6,559,562, which is incorporated herein by reference. In addition, the transformer may be an autotransformer or a conventional step-up transformer, such as a two-winding transformer. In addition, the pulse-width modulated transformer may be an autotransformer or conventional two-winding step-up transformer.

Figure 1:
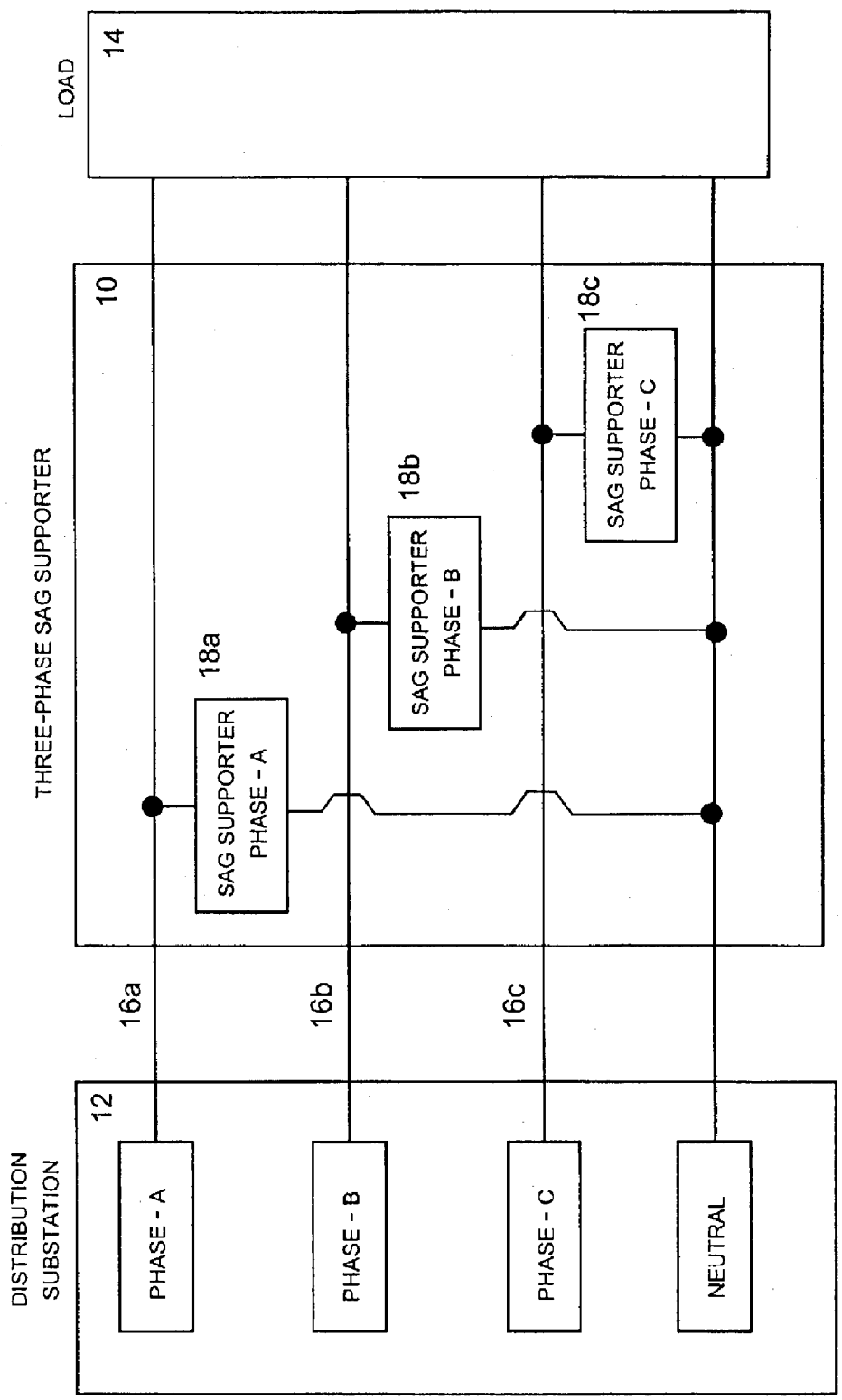
FIG. 1 is an electric circuit diagram of a three-phase voltage sag and over-voltage compensation device for an AC electric power distribution system.
Figure 2:
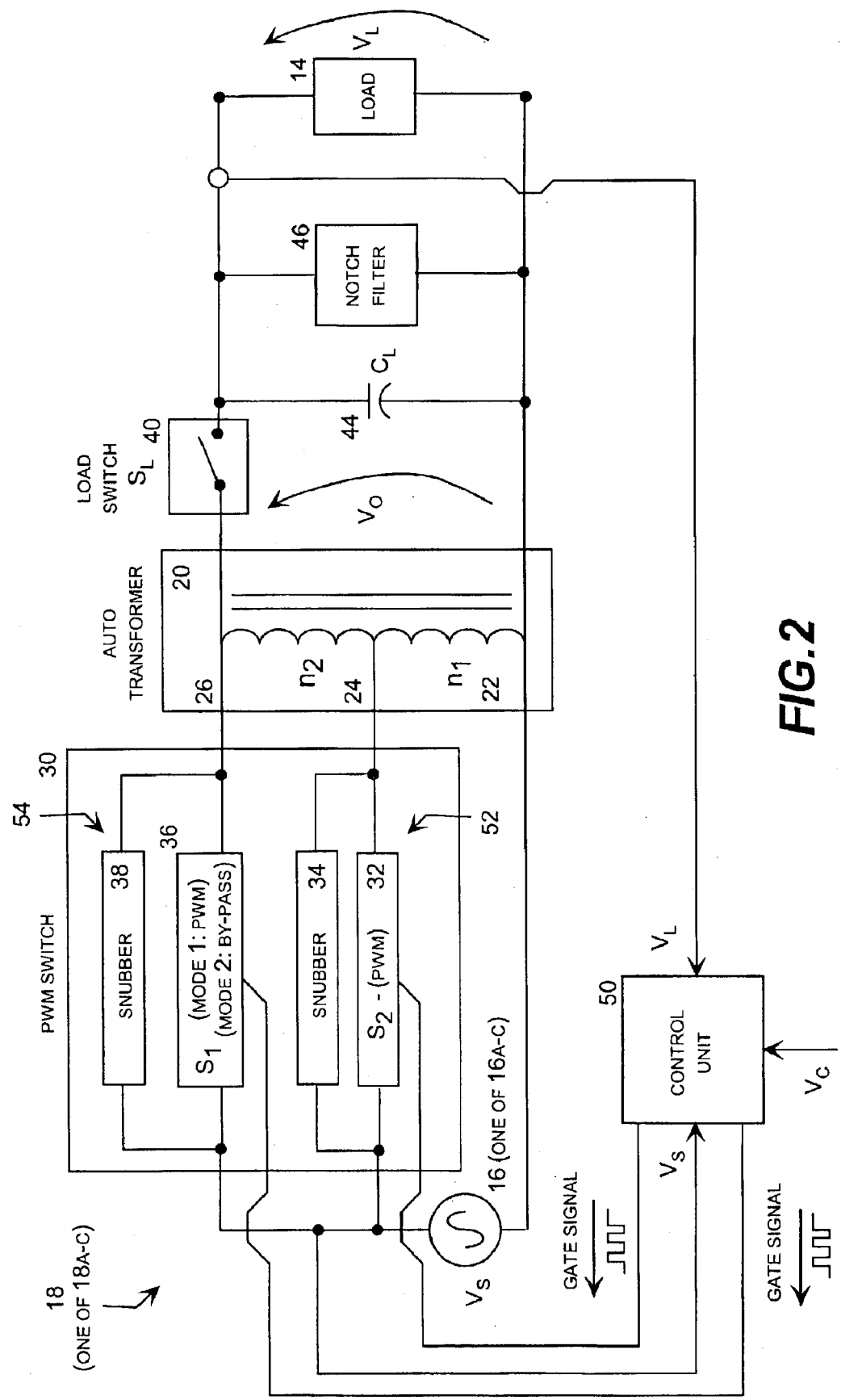
FIG. 2 is an electric circuit diagram of one phase of the three-phase voltage sag and over-voltage compensation device shown in FIG. 1.
Figure 20:
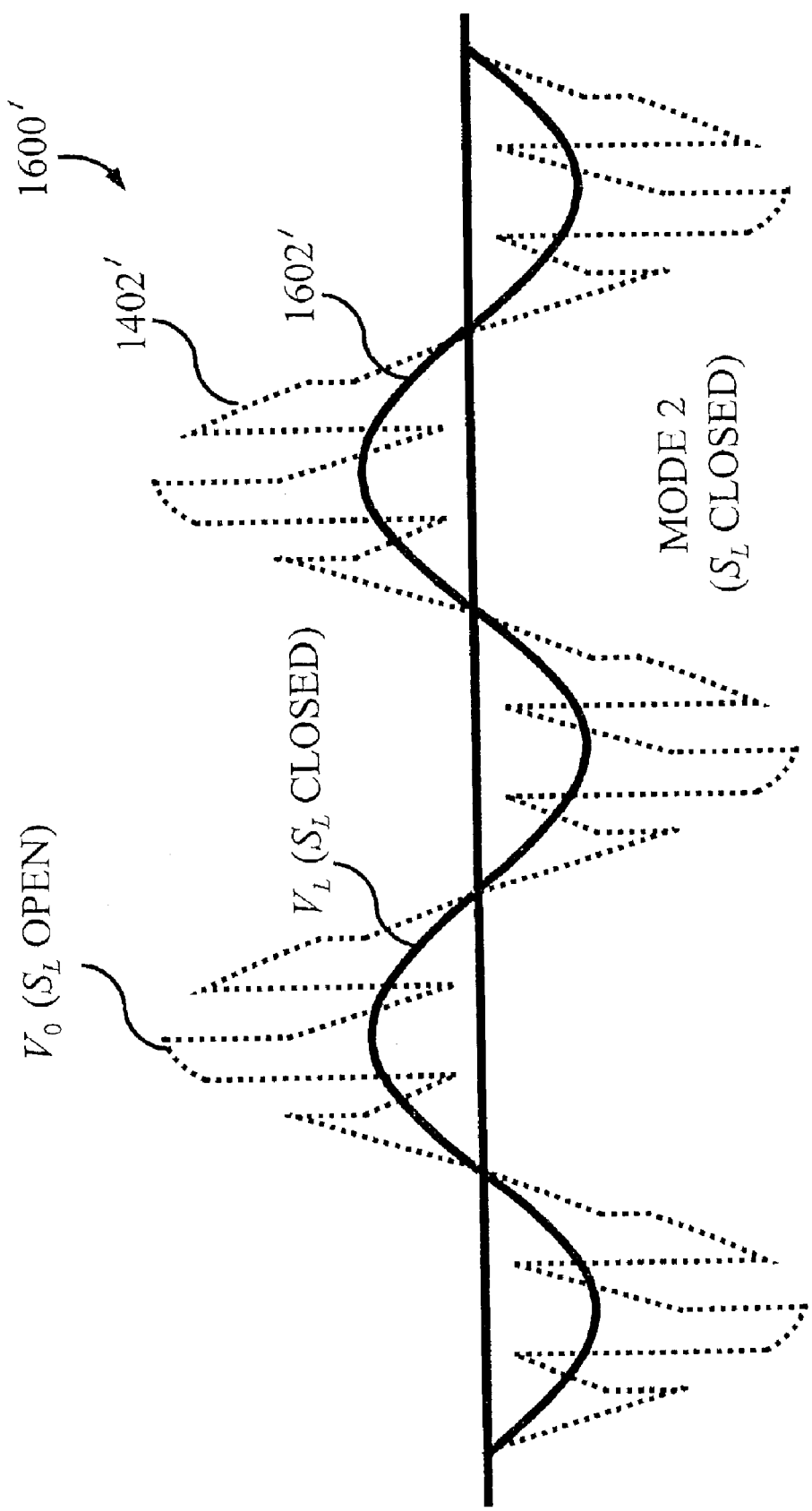
FIG. 20 is a voltage waveform diagram illustrating the load-connected switched output voltage in a second operating mode for a voltage sag and over-voltage compensation device with an alternate snubber circuit.
Figure 21:
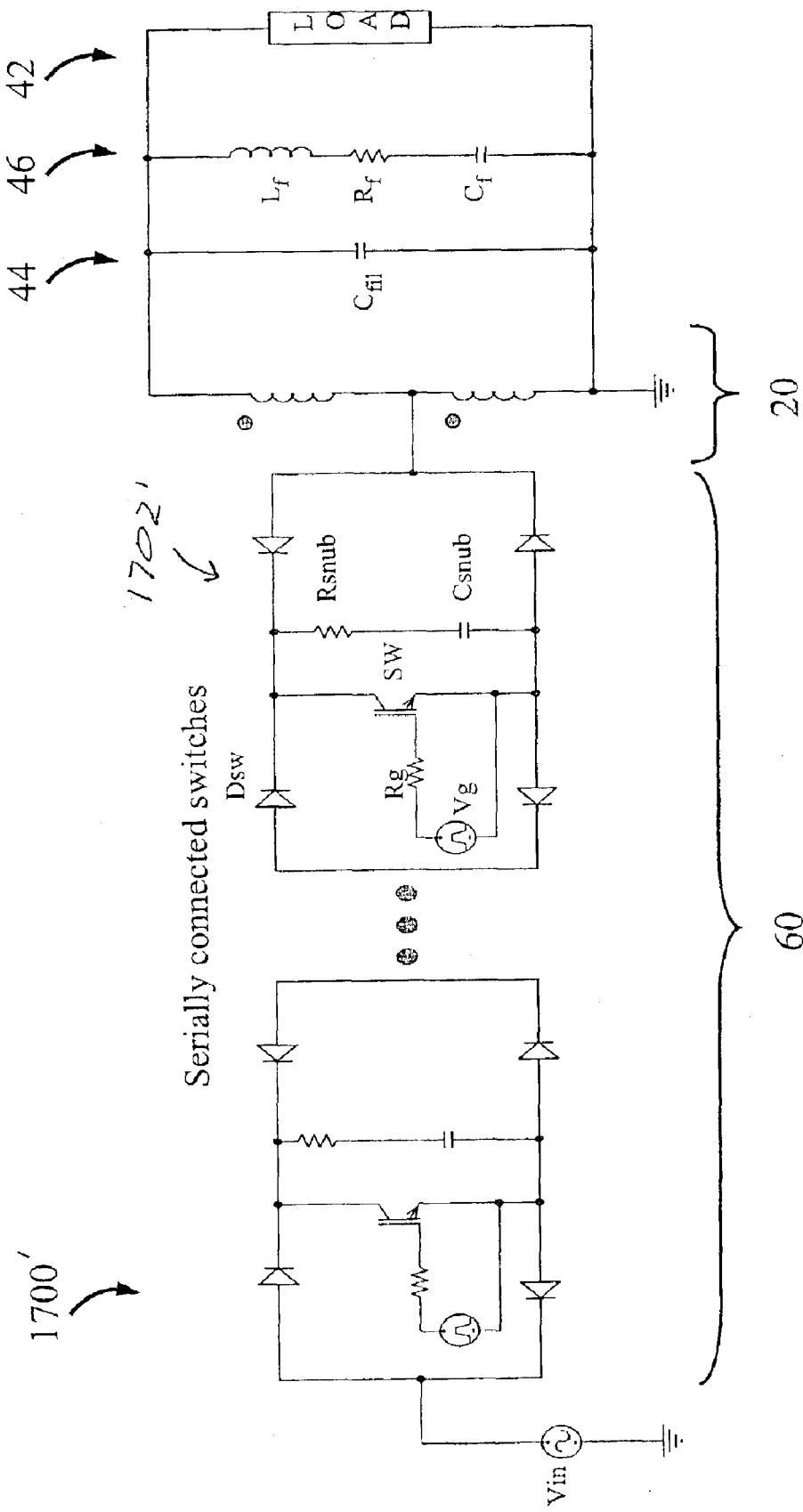
FIG. 21 is an equivalent electric circuit diagram for a voltage sag and over-voltage compensation device with an alternate snubber circuit suitable for computer modeling of the circuit.
Figure 22:
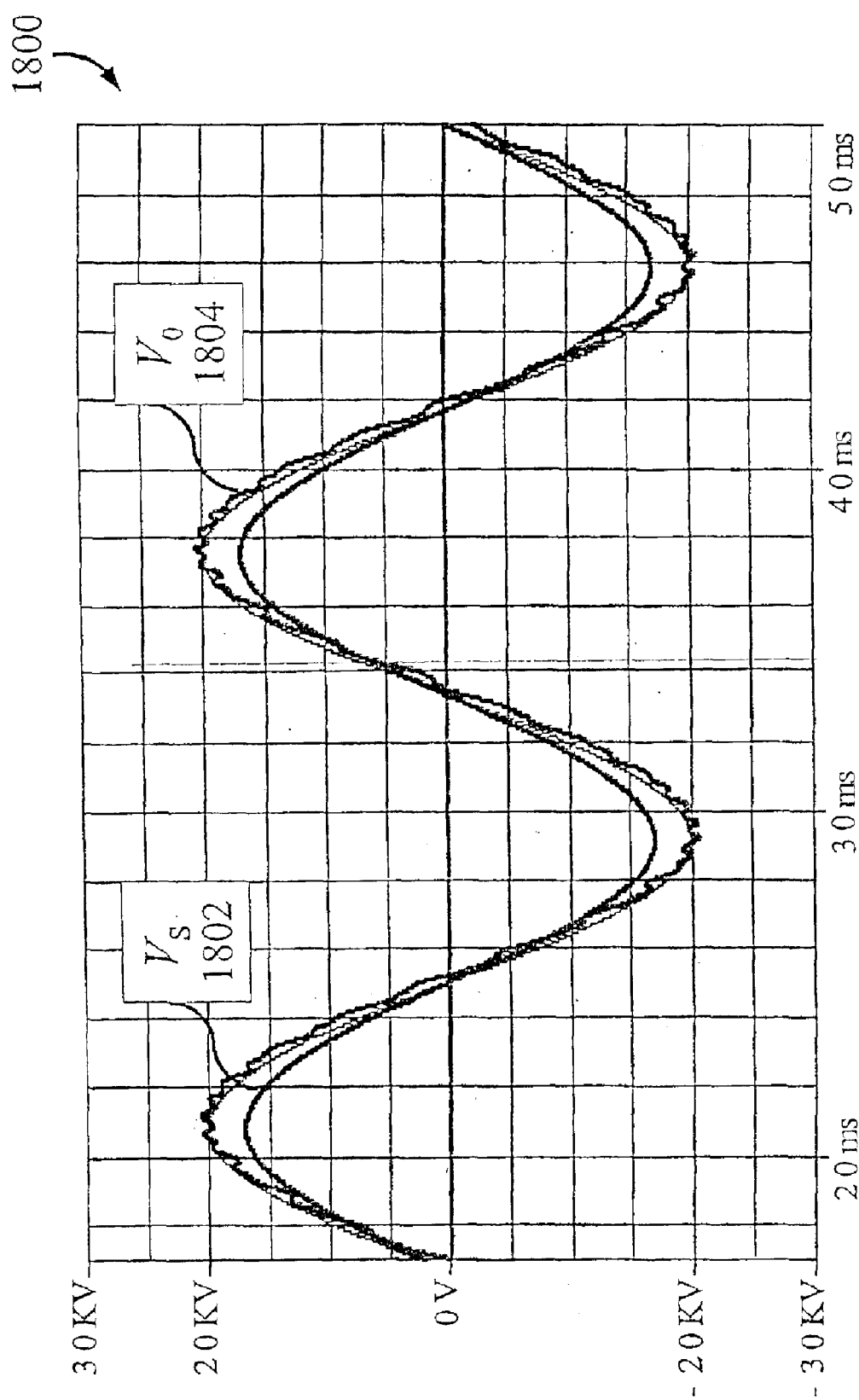
FIG. 22 is a voltage waveform diagram illustrating the results of a computer model of a voltage sag and over-voltage compensation device used for voltage amplification (e.g., voltage sag compensation).
Figure 23:
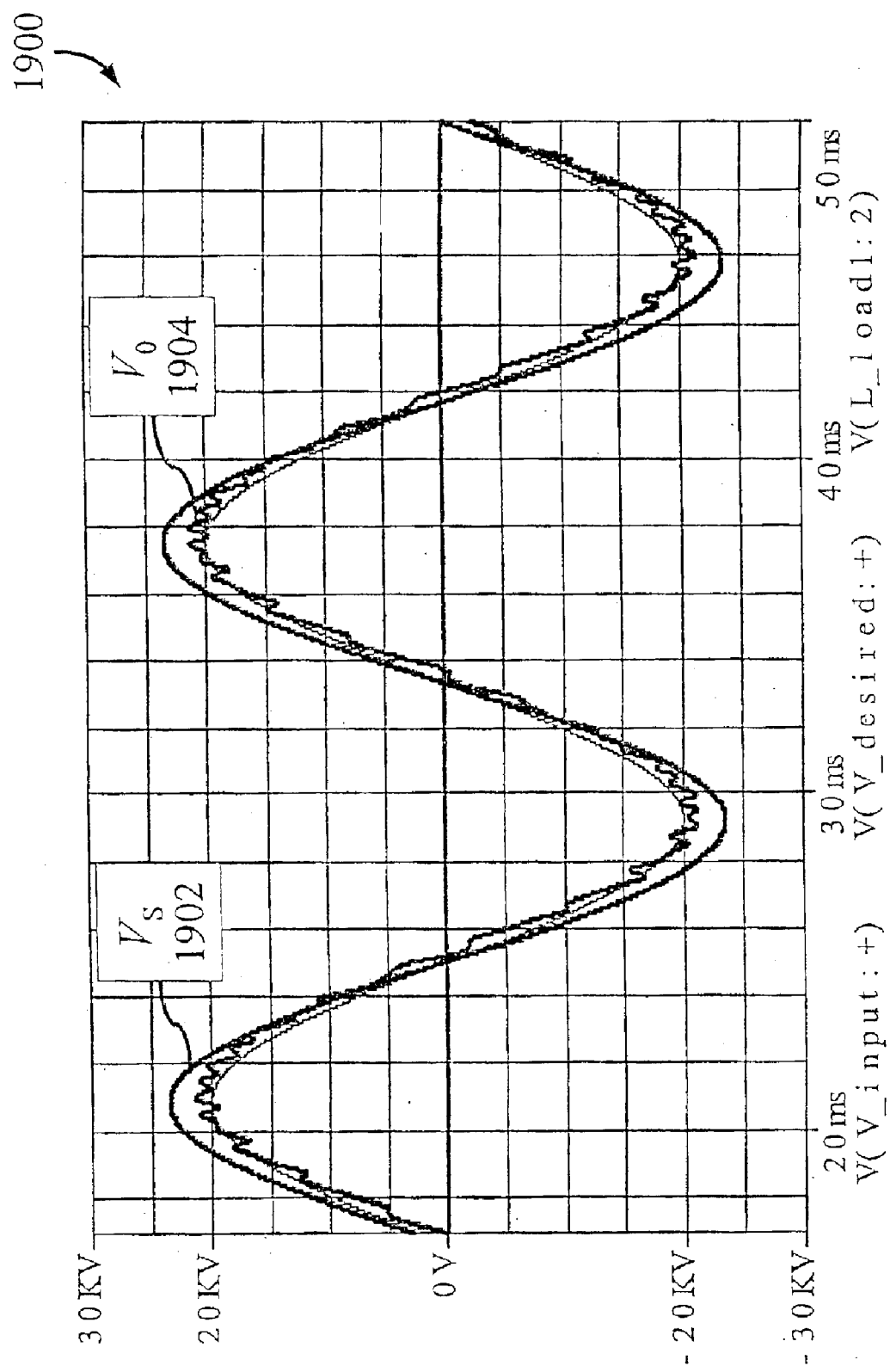
FIG. 23 is a voltage waveform diagram illustrating the results of a computer model of a voltage sag and over-voltage compensation device used for voltage reduction (e.g., over-voltage compensation).

In particular, FIGS. 1–17 illustrate in detail the configuration and operation of a voltage sag and over-voltage compensation device in which the modulating switch is connected in parallel with an autotransformer, as shown in FIG. 2. For this example, the snubber circuit connected in parallel with the modulating switch includes a resistor in series with a capacitor and a diode in parallel with the resistor, as shown in FIGS. 4 and 17. FIGS. 18–21 illustrate the operation of a similar device with an alternate snubber circuit that includes a resistor in series with a capacitor (i.e., does not include a diode in parallel with the snubber resistor), as shown in FIG. 21. FIGS. 22 and 23 illustrate the results of a computer simulation for the equivalent circuit shown in FIG. 17.

Figure 6:
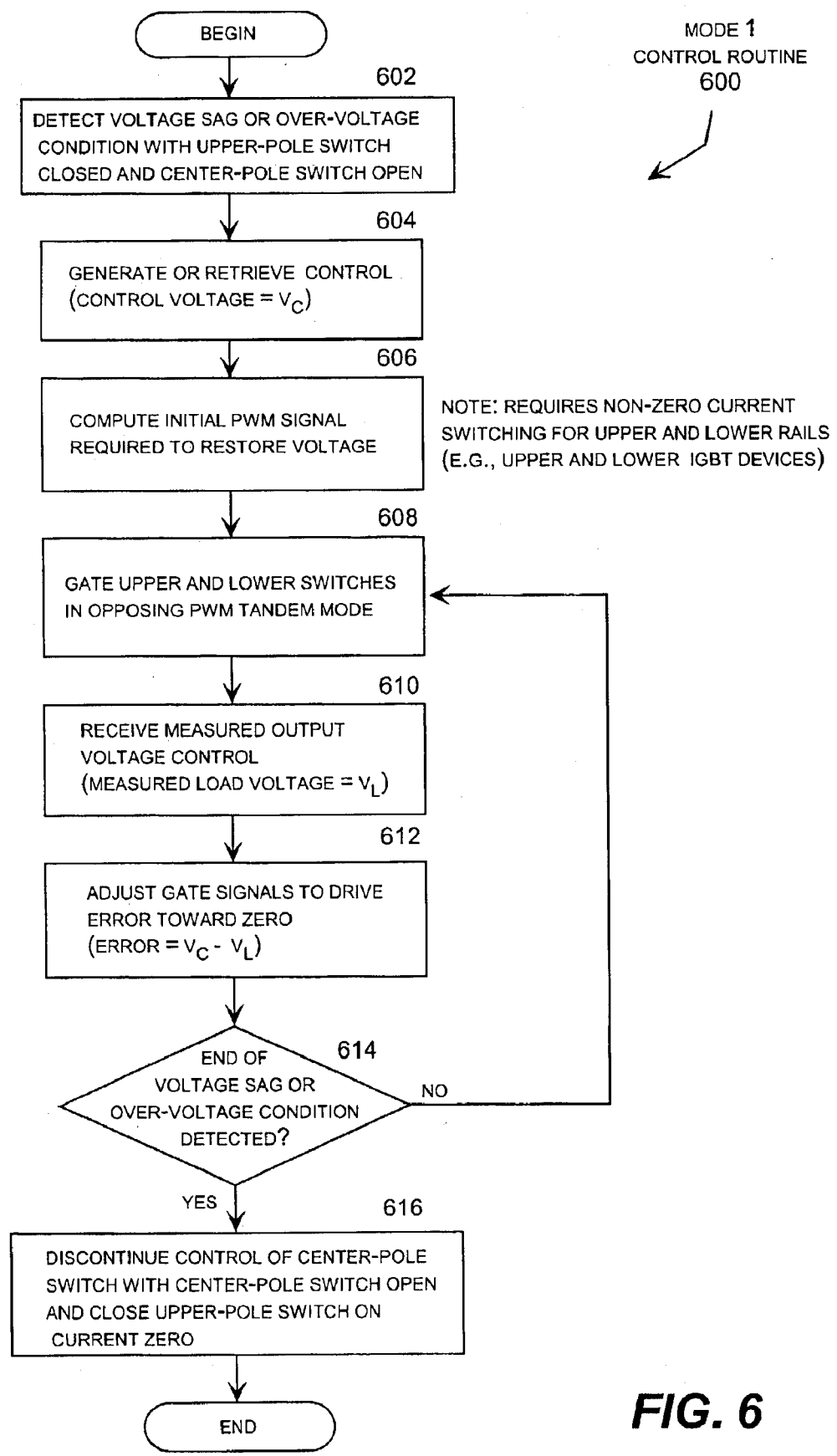
FIG. 6 is a logic flow diagram for a first mode of operating a voltage sag and over-voltage compensation device.
Figure 7:
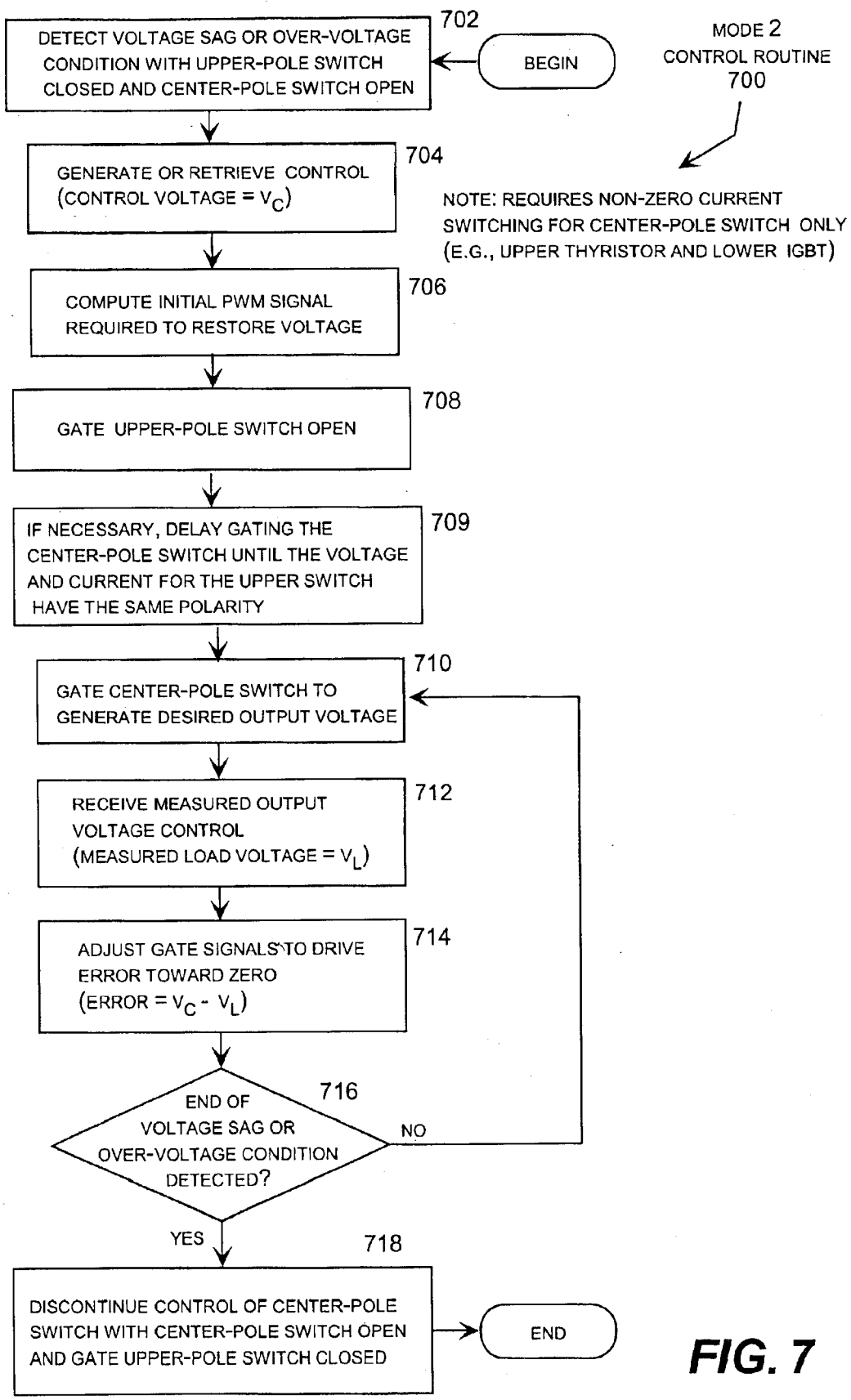
FIG. 7 is a logic flow diagram for a second mode of operating a voltage sag and over-voltage compensation device.

In addition, the same modes of operation illustrated in FIGS. 6 and 7 may be employed to achieve similar results with different circuit configurations. For example, FIGS. 24–27 illustrate several different configurations for the voltage sag and over-voltage compensation device in which the modulating switch connected in series with an autotransformer. Further, FIG. 28 illustrates voltage sag and over-voltage compensation device including a two-winding step-up transformer rather than an autotransformer. Although these different configurations have different considerations concerning voltage ratings and insulation requirements for various components, the operation of the different circuit configurations are analogous. Therefore, it should be understood that all of the configurations shown in FIGS. 24–28 may be operated in the same modes illustrated in FIGS. 6 and 7, and that all of these configurations represent different embodiments of the invention.

For embodiments employing and autotransformer, the transformer typically includes lower, center, and upper poles or taps with cascaded switching devices for selectively connecting the voltage source (i.e., a phase of the distribution line) between the lower pole and the center or upper poles. Each stage of the cascaded switching device includes a switching element located within a full-bridge rectifier circuit to allow bi-directional switching through each switching element (i.e., switching through the same switching element during the positive and negative portions of the AC voltage cycle). Each full-bridge rectifier also includes a snubber circuit connected in parallel with a corresponding switching element to absorb the current discharge caused by switching the input power supply to the transformer through the corresponding switching device under non-zero current conditions. On the output side, the voltage sag and over-voltage compensation device includes a filter capacitor to smooth the voltage-corrected AC power supply toward a sinusoidal power supply at the system frequency, and a notch filter to remove noise created by the switching elements.

Because it is desirable to prevent the voltage at the customer's location from becoming significantly above or below normal, the Pulse-width Modulation (PWM) technique may be used to increase or reduce the output voltage of the compensation device with respect to the input source voltage. This range of control is possible because the input to the transformer is reduced by the percentage of "off" time in the pulse to the transformer. This allows the system to vary the output voltage of the transformer continuously from the transformer turns ratio times the input source voltage (e.g., twice the input source voltage in a transformer with a 1:2 turns ratio) to zero by changing the ratio of "on" and "off" time for connecting the input power supply to the transformer. Undesirable harmonics are mitigated by the use of notch filters and filter capacitors.

An important advantage of the present technology is that it eliminates the need for rectification of the AC power to DC and subsequent inversion from DC back to AC while providing a continuous range of available output voltage levels. That is, the PWM technique used by the present technology to achieve the desired AC output power eliminates the need for a DC power stage while allowing a continuous range of voltage amplification or reduction throughout the operational range of the device. Thus, any desired output voltage level from zero to the transformer turns ratio times the input source voltage may be attained by selecting an appropriate switching frequency and pulse-width for the complete cycle.

Reduction of the number of switching elements is another advantage of the present technology. DC inverters, for example, typically require a switching element for each polarity (i.e., separate switching elements for the positive and negative portions of the AC voltage), whereas the present technique uses the same switching devices for the positive and negative portions of the AC voltage by embedding each switching devices within a full-bridge rectifier circuit. Corresponding snubber circuits are also connected in parallel with corresponding switching elements and embedded within corresponding full-bridge rectifier circuits, so that only one snubber circuit is deployed for each switching element.

High voltage, low current switching is another advantage of the present technology. Series-connected cascades of switching elements are used to build up to the desired high voltage switching level using relatively low cost, commercially available switching devices. The snubber circuits connected in parallel with each switching element help to evenly divide the line voltage across the cascade of switching elements. Because the switching is done at high voltage, there is significantly less current through the switching elements, which allows the use of lower cost, commercially available switching devices.

The snubber circuits may be in any suitable configuration, such as a resistor and capacitor in series or as resistor and capacitor in series with a diode in parallel with the resistor. The role or the snubber resistor is to limit the discharge current through the snubber capacitor when the corresponding switch turns on. The snubber resistor also dissipates the energy stored in the transformer leakage inductance and in the impedance of the source distribution line as the current flows through the resistor-capacitor snubber path. Also, the snubber capacitor receives and temporarily stores this energy, which imposes a voltage across the capacitor when the corresponding switch turns off. To prevent overloading the switch, the value of the snubber capacitor should be selected carefully to limit the voltage across the capacitor to a value less than the voltage rating of the corresponding switch. For example, for a fifteen thousand volt (15 kV) phase voltage and a two and one-half million volt-ampere (2.5 MVA) power rating, the value of the snubber resistor may be seven Ohms (7 Ω) and the value of the snubber capacitor may be thirty five micro-Farads (35 µF). Those skilled in the art will be able to select appropriate element values for other voltage and power requirements.

Low standby losses when the voltage sag and over-voltage compensation device is not in a control mode is another advantage of the present technology. Because the transformer is connected in series in the power circuit only during voltage sag or over-voltage events (i.e., when the voltage sag and over-voltage compensation device is in a control mode), it does not produce significant continuous losses (i.e., less than 1%) when the voltage sag and over-voltage compensation device operates in the standby mode.

The avoidance of costly and physically large energy storage devices and the ability to compensation for voltage sags of unlimited duration are additional advantages of the present technology. Because the present technology does not use stored energy to restore the "missing" voltage and power during voltage sag events, the time duration that the present technology can compensate for a voltage sag event is not limited in duration by the size of the energy storage devices. Virtually all AC-DC-AC inverter technologies suffer from this important technical limitation, or they suffer from an extreme increase in control complexity in order to continually charge and discharge the energy storage devices to the proper voltage levels during the voltage sag event. In addition, the elimination of the AC-DC-AC inverter circuitry greatly reduces the required number of switching elements, while the use of full-bridge inverter circuits further reduce the number of switching elements. These advantages of the present technology result in a relatively simple circuit topology, relatively simple control methods, significantly fewer switching elements, substantially lower cost, and better operating performance than prior voltage compensation technologies.

In a first mode of operation, the control unit gates the upper-pole and switching devices in substantial unison to maintain these switches in opposing configurations. This mode of operation transmits a relatively high amount of power for a given pulse-width, but requires non-zero-current switching devices (e.g., IGBTs) on both the center and upper poles. Alternatively, in a second mode of operation, the control unit switches the upper pole out of the circuit (i.e. by-pass mode) during controlled operation, modulates the center pole while the upper pole is held out of the circuit to produce the desired output voltage, and then switches the center pole out and the upper pole back into the circuit at the end of the control operation. This mode of operation transmits less power for a given pulse-width, but uses non-zero-current switching devices (e.g., IGBTs) only for the center pole, and permits less expensive zero-current switching devices (e.g., thyristors) to be used for the upper pole.

The voltage sag and over-voltage compensation device may utilize a conventional autotransformer with a single winding constructed on a single flux-linking core with a center winding tap, typically in the middle of the winding. However, a two-winding transformer may be configured into a transformer by connecting the high pole of the primary winding to the low pole of the secondary, or vice versa, which may be described as "daisy-chaining" the windings. Similarly, transformers with higher numbers of windings may be configured into an autotransformer by daisy-chaining the windings, as described above. Accordingly, the voltage sag and over-voltage compensation device may utilize any type of transformer, no matter how many individual windings may be involved. In addition, the turns ratio of the autotransformer is preferably about one-to-two (1:2) (i.e., two winding with the same number of turns, or one winding with a center tap), which results in a nominal input-to-output voltage ratio of one-to-two (1:2) for the voltage sag and over-voltage compensation device. However, the voltage sag and over-voltage compensation device may utilize or a conventional two-winding transformer or a transformer with a different turns ratio, if desired, which results in a difference in the pulse-width the required to produce a desired output voltage. Modifications of this sort are well within the skill of those skilled in the electric distribution art.

Those skilled in the art will also appreciate that the voltage sag and over-voltage compensation device may include thyristor or IGBT switching devices, as described above. Nevertheless, the voltage sag and over-voltage compensation device may include other types of switching devices, presently available or developed in the future, that exhibit the desired switching capabilities. Further, the circuit configuration shown for the full-bridge rectifiers, snubbers and notch filter work well for their intended purposes, but may be varied by those skilled in the art so long as the desired functionality may be accomplished. Likewise, variations may be developed to the control schemes described above for the voltage sag and over-voltage compensation device so long as the desired output voltage may be accomplished.

In addition, the present invention may be used to construct voltage sag and over-voltage compensation devices for voltages other than distribution voltages, such as customer delivery voltages, the voltages of specific pieces of equipment, sub-transmission or even transmission voltages provided that electric devices, and in particular primarily switching devices, having the desired characteristics can be constructed. Given the current state of electric power devices, however, distribution voltages are presently the most advantage voltage levels for implementing the voltage sag and over-voltage compensation devices using the present technology.

It should be appreciated that above-described voltage sag and over-voltage compensation device significantly improves over prior voltage compensation devices in that no energy storage devices are required, and over-voltage conditions are not imposed on the load at the conclusion of a voltage sag event. The present technology is much simpler than prior voltage compensation technologies in that it avoids AC-DC-AC power conversion, uses full-bridge rectifiers to reduces the number of active switching elements, and uses well developed transformer technology as the basic design element. Cascading the switching elements allows the present technology to switching at high voltage with lower currents. In addition, a single switching frequency with a single pulse-width for any given voltage compensation condition makes the control system relatively simple to design and implement. The combination of these advantages results in a comparatively uncomplicated design that exhibits lower cost and higher reliability, while providing improved voltage compensation performance.

Turning now to the figures, in which like numerals refer to like elements throughout the several figures, FIG. 1 is an electric circuit diagram of a three-phase voltage sag and over-voltage compensation device 10 for an AC electric power distribution system. The voltage sag and over-voltage compensation device 10 is typically connected between an electric power distribution substation 12 and a load 14 to be provided with voltage sag and over-voltage protection. To minimize the likelihood of faults occurring downstream from the voltage sag and over-voltage compensation device 10, the device may be physically located as close to the load end as possible, for example on the high-voltage side of the customer's delivery-voltage transformer.

In particular, the voltage sag and over-voltage compensation device 10 may often be pole-mounted adjacent to the customer's pole-mounted delivery-voltage transformer. Each phase of the electric power distribution 16*a*–*c* typically includes its own corresponding voltage sag and over-voltage compensation device 18*a*–*c*. Although the voltage sag and over-voltage compensation device 10 is shown connected in a "Wye" configuration, it may alternatively be connected in a "Delta" configuration. That is, the voltage sag and over-voltage compensation device 10 is typically connected in a "Wye" configuration for a "Wye" connected distribution circuit, while it is typically connected in a "Delta" configuration for a "Delta" connected distribution circuit.

In addition, in some cases it may be practical to install a voltage sag and over-voltage compensation device 10 near or adjacent to a particularly sensitive piece of equipment, such as a controller for a manufacturing operation, and to operate the device at the service voltage of that piece of equipment. This would allow the voltage compensation device to protect the sensitive piece of equipment from voltage sags and over-voltage conditions caused by other pieces of equipment on the customer's premises. Nevertheless, it is presently anticipated that the many feasible installations of the present technology will be pad-mounted, pole-mounted or underground configurations at distribution line voltages located near a customer's deliver transformer. In particular, it is anticipated that for many installations, a three phase transformer may be housed in a first enclosure, and that three phases of switching and snubbers circuits may be located in second enclosure, with both enclosures sized for pad-mounted, pole-mounted or underground installations.

FIG. 2 is an electric circuit diagram of one phase of the three-phase voltage sag and over-voltage compensation device 10, (i.e., one of 18*a*–*c*), which will be referred to as the "voltage compensation device 18." This voltage compensation device 18 includes a transformer 20 functionally coupled to a pulse-width modulation switch 30. The transformer 20 includes a lower pole 22, a center pole 24, and an upper pole 26. The pulse-width modulation switch 30 includes a center-pole switch 52 that selectively connects the voltage source 16, typically a corresponding phase 16*a*–*c* of the electric power distribution line, between the lower pole 22 and the center pole 24. The center-pole switch 52 includes a center-pole switching device 32 and a center-pole snubber 34 connected in parallel with the center-pole switching device 32. Similarly, the pulse-width modulation switch 30 includes an upper-pole switch 54 that selectively connects the voltage source 16 between the lower pole 22 and the upper pole 26. The upper-pole switch 54 includes an upper-pole switching device 36 and an upper-pole snubber 38 that is connected in parallel with the upper-pole switching device 36.

The voltage compensation device 18 also includes a load switch 40 that is shown on the load side of the transformer 20 for the purpose of illustrating the operating conditions of the voltage compensation device 18 when it is loaded (i.e., connected to the load 14) and when it is not loaded (i.e., not connected to the load 14). That is, the load switch 40 may not actually be implemented as part of the voltage compensation device 18, but its presence is useful for the purpose of describing the loaded and no-load operating principles of the device.

On the output side, the voltage compensation device 18 includes a filter capacitor 44 connected in parallel with the load 14 to smooth the voltage-corrected AC power supply toward a sinusoidal power supply at the system frequency. The filter capacitor 44 may alternatively be described as being connected between the upper pole 26 and the lower pole 22 of the transformer 20. The voltage compensation device 18 also includes a notch filter 46 connected in parallel with the load 14 to remove noise created by the switching elements. Again, the notch filter 46 may alternatively be described as being connected between the upper pole 26 and the lower pole 22 of the transformer 20. The voltage compensation device 18 also includes a control unit 50 for selectively gating the upper-pole switch 54 and the center-pole switch 52 to generate a desired output voltage ($V_O$) between the upper pole 26 and the lower pole 22 of the transformer 20. Typically, the control unit 50 receives a control signal corresponding to the measured load voltage ($V_L$) as a control variable, a control signal corresponding to the measured source voltage ($V_S$) as a control variable, and operates to reduce the error between this signal and a computed or received control voltage ($V_C$), which represents the desired output voltage of the voltage compensation device 18. Specifically, the control unit 50 may compute the control voltage ($V_C$) based the feed-back measurement of the source voltage ($V_S$) and a pre-set peak voltage level, look it up in a storage location, or receive it from a remote location.

Figure 3:
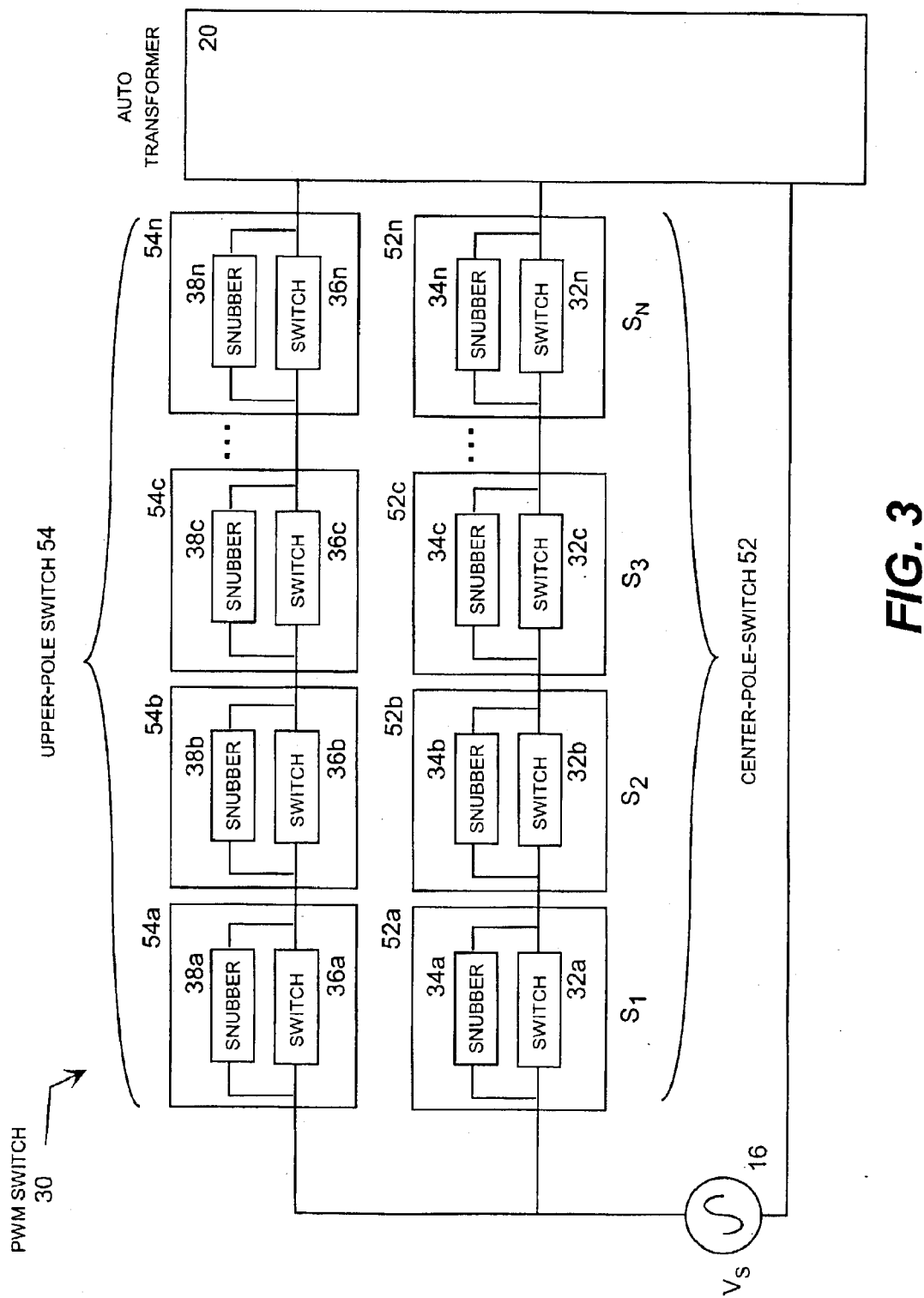
FIG. 3 is an electric circuit diagram of cascade switching devices in a voltage sag and over-voltage compensation device.
Figure 4:
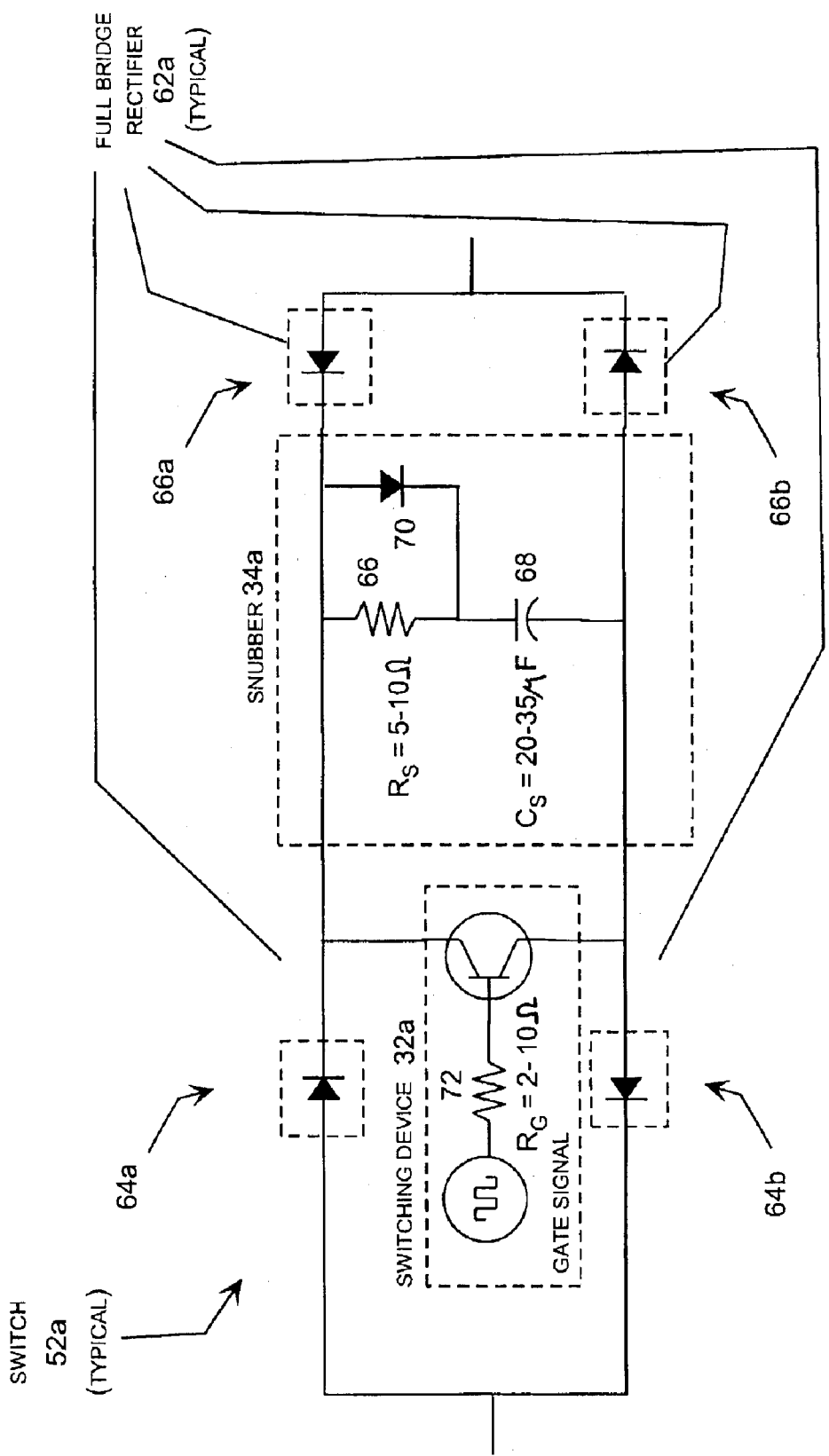
FIG. 4 is an electric circuit diagram of a switching device and snubber located in a full-bridge rectifier in a voltage sag and over-voltage compensation device.

FIG. 3 is an electric circuit diagram of the pulse-width modulation switch 30, which is preferably implemented as two parallel sets or cascades of series-connected switches 52*a*–*n* and 54*a*–*n*. One of the cascades 52*a*–*n* forms the center-pole switch 52, while the other cascade 54*a*–*n* forms the upper-pole switch 54. The cascade switching approach is appropriate because the voltage levels used for electric power distribution are typically higher than the threshold voltages that conventional IGBT and thyristor switching devices can withstand without breaking down (i.e., unintended conduction of current). Therefore, the upper-pole switch 54 and center-pole switch 52 are each constructed form a cascade of series-connected switches ($S_1$–$S_n$) in which the total switching voltage is relatively evenly distributed among the modulating switches of the cascade. More specifically, each stage of the center-pole cascade 52*a*–*n* includes a substantially identical switching device 32*a*–*n*, each with a respective parallel-connected snubber 34*a*–*n*. Each switching device 32*a*–*n* is typically operated simultaneously, for example from the same gating signal. The substantially identical snubbers 34*a*–*n* help to evenly divide the total switching voltage relatively evenly across the corresponding switches 32*a*–*n*. Similarly, each stage of the upper-pole cascade 54*a*–*n* includes a substantially identical switching device 36*a*–*n*, each with a respective parallel-connected snubber 38*a*–*n*. Again, each switching device is typically operated simultaneously, for example from the same gating control signal, and the substantially identical snubbers 38*a*–*n* help to evenly divide the voltage across the corresponding switching devices 36*a*–*n*.

FIG. 4 is an electric circuit diagram of an illustrative switch 52*a*, which includes a switching device 32*a* and snubber 34*a* located within a full-bridge rectifier 62*a*. That is, each switch 52*a*–*n* and 54*a*–*n* contains a corresponding switching device and parallel connected snubber located within a respective full-bridge rectifier, which is represented by the typical full-bridge rectifier 62*a* shown in FIG. 4. The full-bridge rectifier 62*a* allows bi-directional switching through the switching element 32*a* (i.e., switching through the same switching element 32*a* during the positive and negative portions of the AC voltage cycle). The full-bridge rectifier 62a includes opposing parallel-connected sets of reverse-polarity diodes 64a–b and 66a–b, as is familiar to those skilled in the art. The switching device 32a and snubber 34a are connected in parallel in the center of the full-bridge rectifier 62a, between diode sets 64a–b and 66a–b. This is a typical circuit arrangement that may apply for all of the modulating switch 52a–n and 54a–n. As shown in FIG. 3 in view of FIG. 4, a cascade of full-bridge rectifier circuits with embedded switching elements and snubbers selectively connect the voltage source 16 to the center pole 24 or the upper pole 26 of the transformer 20. However, it should be appreciated that the snubbers 38a–n may be eliminated or replaced by less expensive voltage dividing circuitry for the upper-pole switches 54a–n when these devices are thyristors or other switching devices that can only switch under zero-current conditions.

Each snubber, as represented by the snubber 34a, typically includes a snubber resistor 66 and a snubber capacitor 68 connected in series and a snubber diode 70 connected in parallel with the snubber resistor. One of ordinary skill in the art may select the ratings and unit specifications for these elements to be appropriate for the particular application. For example, for a 15 kV, 2.5 MVA distribution circuit, the devices might be rated for 15 kV, 2.5 MVA, and the snubber resistor 66 may be in the range of five to ten Ohms ($R_S$=5–10 $\Omega$), and the snubber capacitor 68 may be in the range of twenty to thirty five micro-Farad capacitor ($C_S$=20–35 $\mu$F). In addition, the gating resistor 72 shown in FIG. 4 should be appropriate for the switching device 32a, in this example in the range of two to ten Ohms ($R_G$=2–10 $\Omega$).

Figure 5B:
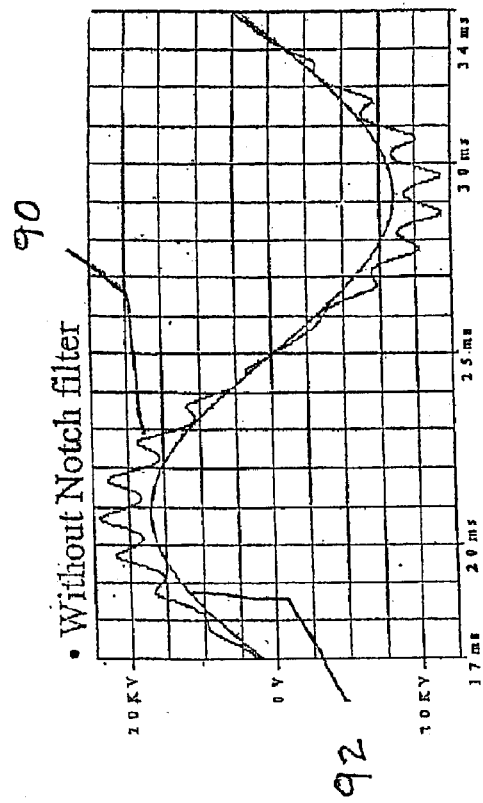
FIG. 5B is a voltage waveform diagram illustrating the output voltage of a voltage sag and over-voltage compensation device without a notch filter.
Figure 5C:
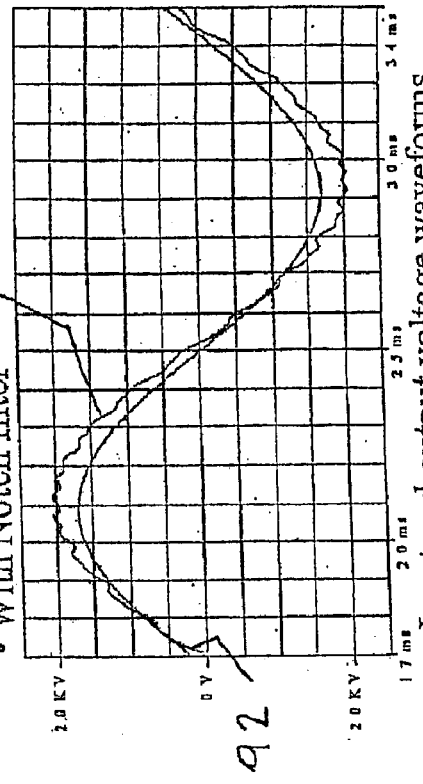
FIG. 5C is a voltage waveform diagram illustrating the output voltage of a voltage sag and over-voltage compensation device with a notch filter.
Figure 5A:
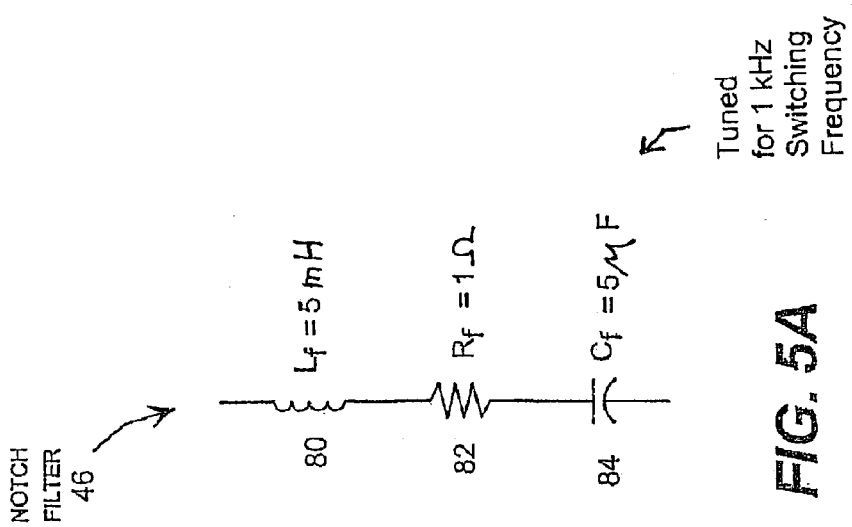
FIG. 5A is an electric circuit diagram of a notch filter in a voltage sag and over-voltage compensation device.

FIG. 5A is an electric circuit diagram of a notch filter 46 for the voltage compensation device 18. To remove noise created by gating the switching elements at a gating frequency, in this example one thousand Hertz (1 kHz), the voltage compensation device 18 includes the notch filter 46 connected between the neutral pole 22 and the upper pole 26 of the transformer 20, as shown in FIG. 2. The notch filter 46 is preferably configured to reduce power disturbances occurring in the voltage-corrected AC power supply within a filter frequency range about the gating frequency. Specifically, for a switching frequency of one thousand Hertz (1 kHz), the notch filter may include a filter inductor 80 with a value of five milli-Henries ($L_F$=5 mH), a filter resistor 82 with a value of one Ohm ($R_F$=1 $\Omega$), and a filter capacitor 84 with a value of five micro-Farads ($C_F$=5 $\mu$F) connected in series. One of ordinary skill in the art may select the ratings and unit specifications for the circuit elements to be appropriate for any particular application.

FIG. 5B is a voltage waveform diagram illustrating the output voltage 90 of the voltage compensation device 18 without the notch filter 46 in the circuit. This output voltage waveform diagram is compared to the input voltage 92 (i.e., $V_S$) to illustrate the ripples that occur in the output voltage 90 caused by gating the switching elements at a gating frequency, in this example one thousand Hertz (1 kHz), without the notch filter 46 in the circuit. FIG. 5C is a voltage waveform diagram illustrating the output voltage 94 of voltage compensation device 18 with the notch filter 46 in the circuit. As shown, in FIG. 5C, the notch filter 46 significantly reduces the ripples in the output voltage 94, as compared to those occurring in the output voltage 90 shown in FIG. 5B.

FIG. 6 is a logic flow diagram for routine 600 for a first mode of operating the voltage compensation device 18. For convenience, the following description of control routine 600 will refer to the elements shown on FIG. 2. Control routine 600 begins in step 602, in which the control unit 50 detects a voltage sag or over-voltage condition in a real-time measurement of the source voltage ($V_S$). This step 602 occurs with the upper-pole switch 54 closed and the center-pole switch 52 open, which is the non-control or "stand-by" condition of the voltage compensation device 18. Step 602 is followed by step 604, in which the control unit 50 generates or receives a desired nominal control voltage ($V_C$), such as a one per-unit sinusoidal output voltage at the nominal voltage and desired phase angle. Step 604 is followed by step 606, in which the control unit 50 computes an initial pulse-width modulated gating signal to restore the load voltage ($V_L$) to the desired nominal control voltage ($V_C$). Step 606 is followed by step 608, in which the control unit 50 gates the center-pole switch 52 and the upper-pole switch 54 in substantial unison to maintain these switches in opposing configurations. That is, the control unit 50 gates the center-pole switch 52 off when it gates the upper-pole switch 54 on, and vice versa, throughout the control period.

Step 608 is followed by step 610, in which the control unit 50 receives a real-time control signal indicating a measured value for the load voltage ($V_L$). Step 610 is followed by step 612, in which the control unit 50 adjusts the gating signal to drive the error between the measured load voltage ($V_L$) and the control voltage ($V_C$) toward zero. Step 612 is followed by step 614, in which the control unit 50 determines whether an end of the voltage sag or over-voltage event has occurred. If an end of the voltage sag or over-voltage event has not been detected, the "NO" branch loops back to step 608, and the control operation continues. If an end of the voltage sag or over-voltage event has been detected, the "YES" branch is followed to step 616, in which the control unit 50 discontinues control operation. Specifically, the control unit 50 switches the center-pole switch 52 open and switches the upper-pole switch 54 closed on the next occurring zero-current condition. Step 616 is followed by the "END" step, which indicates the conclusion of routine 600.

FIG. 7 is a logic flow diagram for routine 700 for a second mode of operating the voltage compensation device 18. For convenience, the following description of control routine 700 will refer to the elements shown on FIG. 2. Control routine 700 begins in step 702, in which the control unit 50 detects a voltage sag or over-voltage condition in a real-time measurement of the source voltage ($V_S$). This step 702 occurs with the upper-pole switch 54 closed and the center-pole switch 52 open, which is the non-control or "stand-by" condition of the voltage compensation device 18. Step 702 is followed by step 704, in which the control unit 50 generates or receives a desired nominal control voltage ($V_C$), such as a one per-unit sinusoidal output voltage at the nominal voltage and desired phase angle. Step 704 is followed by step 706, in which the control unit 50 computes an initial pulse-width modulated gating signal to restore the load voltage ($V_L$) to the desired nominal control voltage ($V_C$). Step 706 is followed by step 708, in which the control unit 50 gates the upper-pole switch 54 open. This places the upper pole in a by-pass mode. Step 708 is followed by step 709, in which the control unit 50 delays gating the center-pole switch 52 until the voltage and current through the upper-pole switch 54 have the same polarity, if necessary. Step 709 is followed by step 710, in which the control unit 50 gates the center-pole switch 52 to produce the desired load voltage ($V_L$). That is, the upper-pole switch 54 is used as a by-pass, and the center-pole switch 52 is gated to produce the desired load voltage ($V_L$), during the control operation.

Step 710 is followed by step 712, in which the control unit 50 receives a real-time control signal indicating a measured value for the load voltage ($V_L$). Step 712 is followed by step 714, in which the control unit 50 adjusts the gating signal to drive the error between the measured load voltage ($V_L$) and the control voltage ($V_C$) toward zero. Step 714 is followed by step 716, in which the control unit 50 determines whether an end of the voltage sag or over-voltage event has occurred. If an end of the voltage sag or over-voltage event has not been detected, the "NO" branch loops back to step 710, and the control operation continues. If an end of the voltage sag or over-voltage event has been detected, the "YES" branch is followed to step 718, in which the control unit 50 discontinues control operation. Specifically, the control unit 50 gates the center-pole switch 52 open and gates the upper-pole switch 54 closed, which causes the upper-pole switch to close on the next occurring zero-current condition. This ends the by-pass mode for the upper-pole switch 54. Step 718 is followed by the "END" step, which indicates the conclusion of routine 700.

Figure 8:
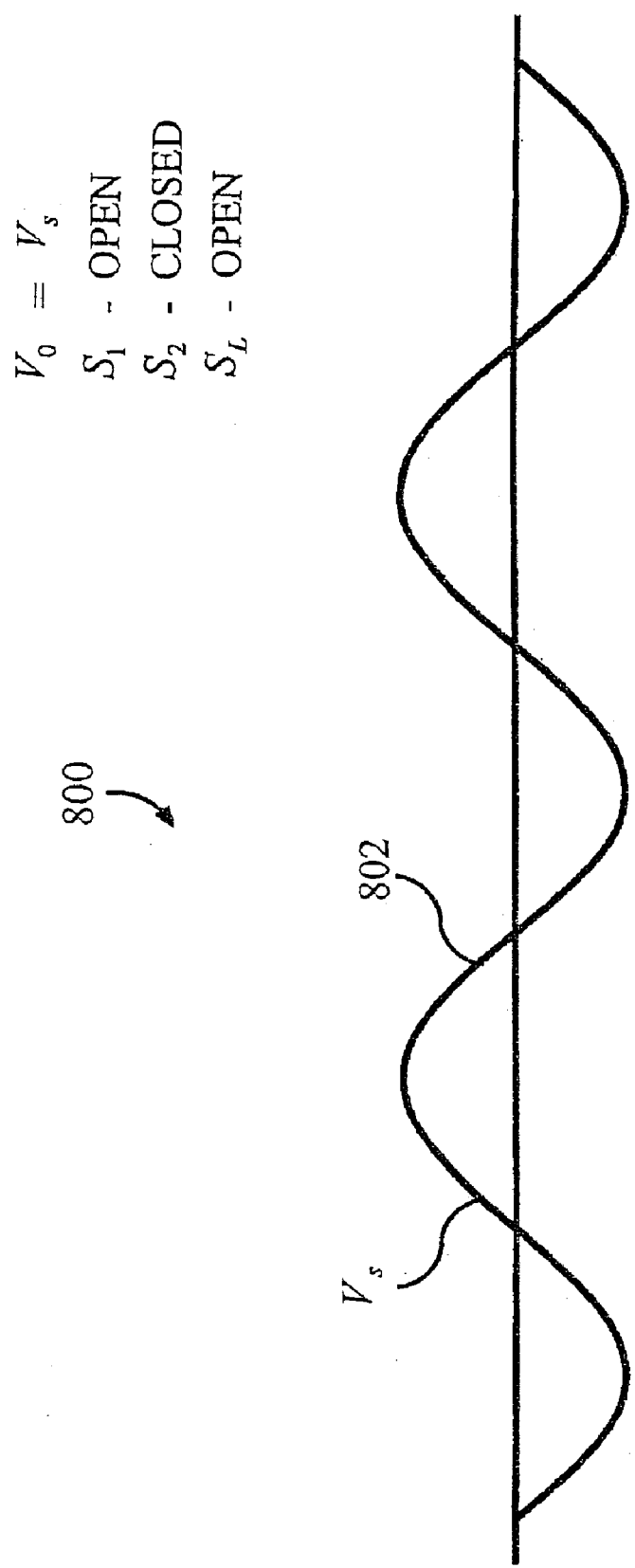
FIG. 8 is a voltage waveform diagram illustrating an input source voltage for a voltage sag and over-voltage compensation device.

FIGS. 8–20 are voltage waveform diagrams illustrating the operation of the voltage compensation device 18 during the first and second operating modes described above. For convenience, the following description of FIGS. 8–16 will refer to the elements shown on FIG. 2. FIG. 8 is a voltage waveform diagram 800 illustrating the source voltage 802 ($V_S$) (e.g., the line voltage for one of lines 16a–c) for the voltage compensation device 18. Typically, the source voltage 802 ($V_S$) will nominally be a one per-unit sinusoidal waveform that may experience voltage sag or over-voltage events from time to time. The purpose of the voltage compensation device 18 is to compensate for these voltage sags or over-voltage so that the voltage at the load 14 ($V_L$) will not experience the voltage sag or over-voltage events.

Figure 9:
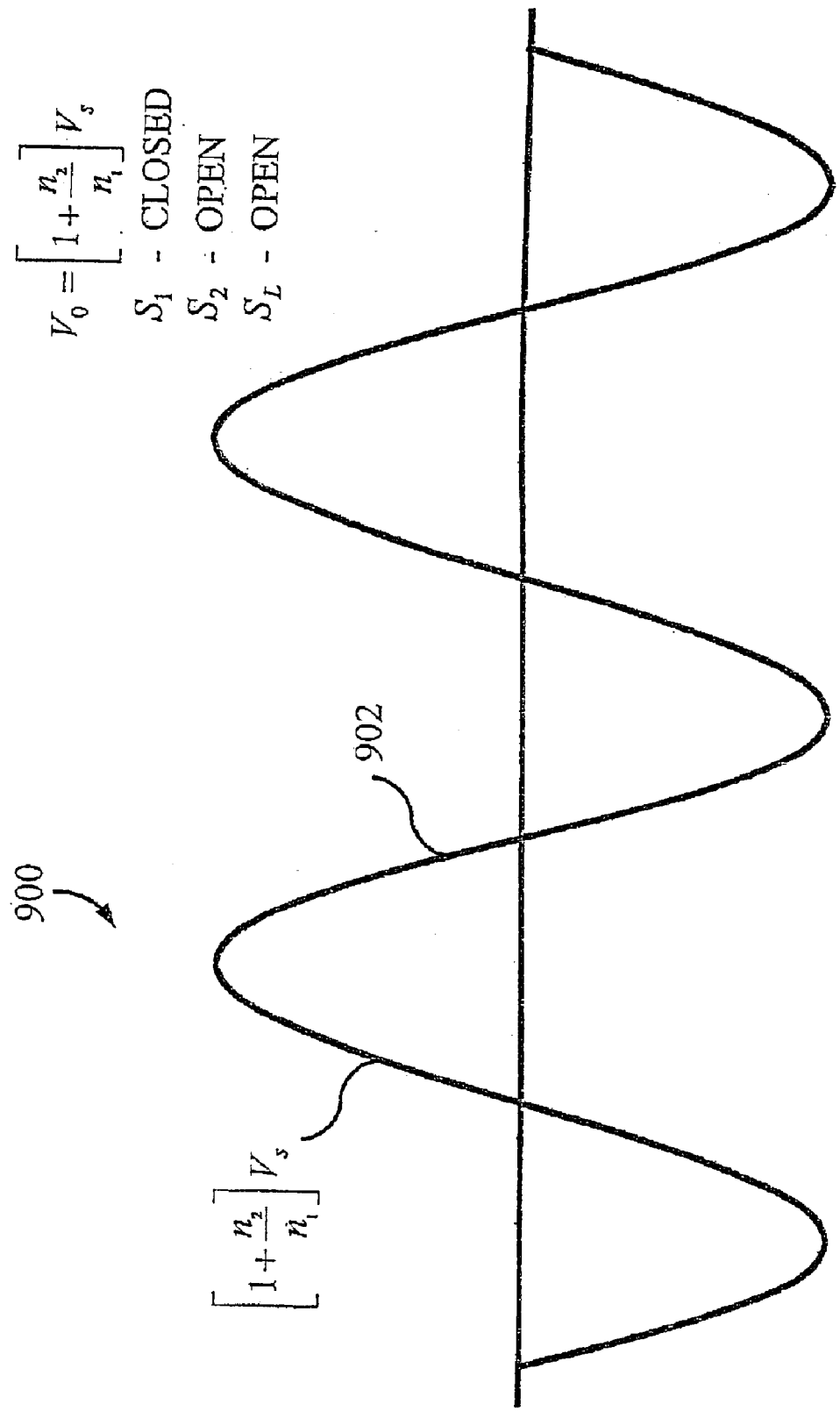
FIG. 9 is a voltage waveform diagram illustrating an unswitched output voltage for a voltage sag and over-voltage compensation device.

FIG. 9 is a voltage waveform diagram 900 illustrating an unswitched output voltage 902 ($V_O$) for the voltage compensation device 18. That is, output voltage 902 ($V_O$) represents the voltage between the lower pole 22 and the upper pole 26 of the transformer 20 when the center-pole switch 52 ($S_1$) is closed, the upper-pole switch 54 ($S_2$) is open, and the load switch 40 ($S_L$) is open. As shown, the output voltage 902 ($V_O$) is substantially equal to the source voltage 802 ($V_S$) multiplied by the turns ratio of the transformer 20, $[(n_1+n_2)/n_1]$, where $n_1$ represents the number of turns between the lower pole 22 and the center pole 24 of the transformer 20 and where $n_2$ represents the number of turns between the center pole 24 and the upper pole 26 of the transformer 20. In this particular example, $n_1$ is equal to $n_2$, which produces a turns ratio of two.

Figure 10:
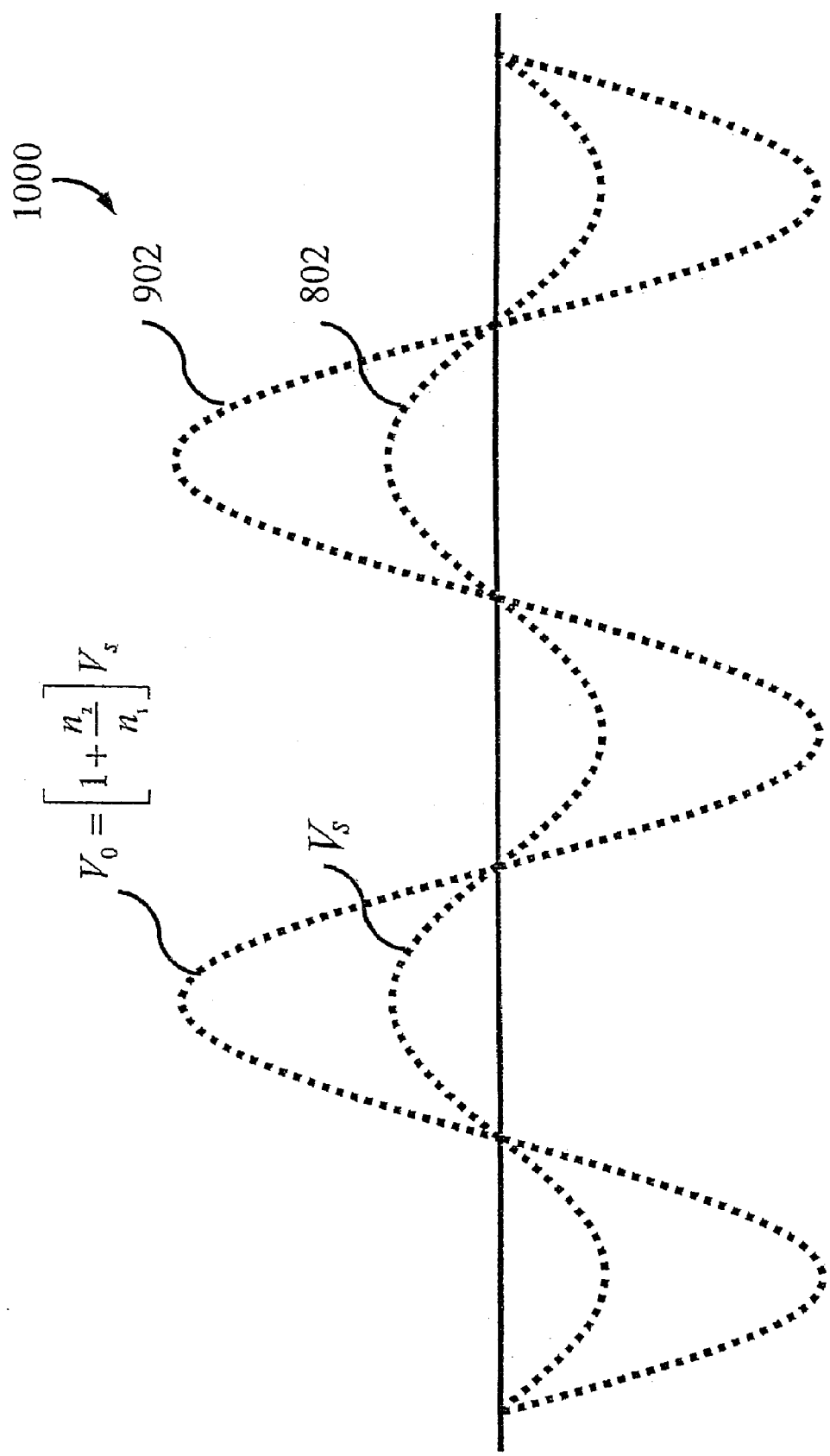
FIG. 10 is a voltage waveform diagram comparing the input source voltage to the unswitched output voltage for a voltage sag and over-voltage compensation device.
Figure 11:
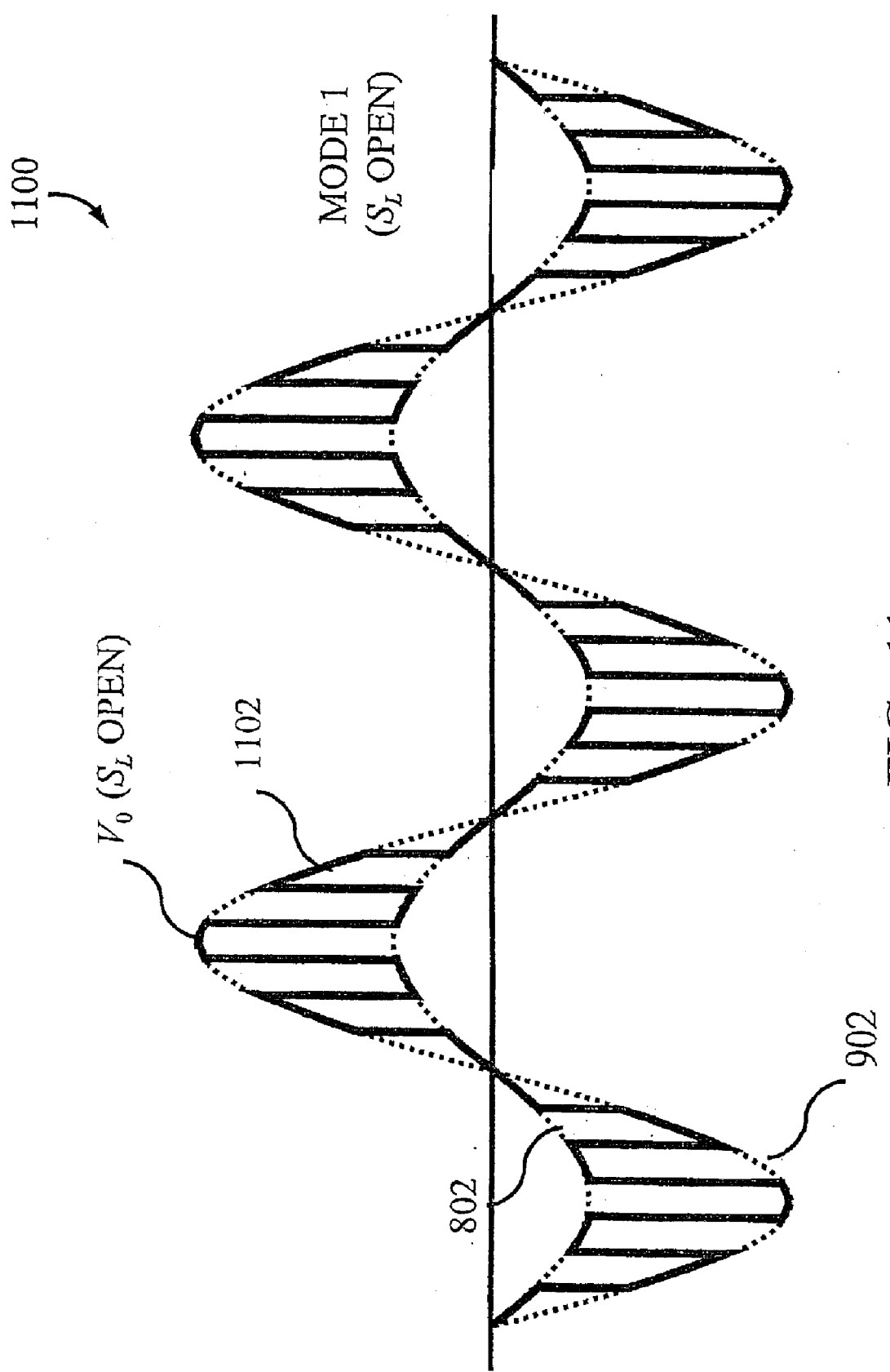
FIG. 11 is a voltage waveform diagram illustrating a no-load switched output voltage in a first operating mode for a voltage sag and over-voltage compensation device, including phantom lines.

FIG. 10 is a voltage waveform diagram 1000 comparing the source voltage 802 ($V_S$) to the unswitched output voltage 902 ($V_O$), which are shown in phantom lines. FIG. 11 is a voltage waveform diagram 1100 illustrating the no-load switched output voltage 1102 ($V_O$) in a first operating mode for a the voltage compensation device 18. This first operating mode corresponds to control routine 600 described previously with reference to FIG. 6. That is, output voltage 1102 ($V_O$) represents the voltage between the lower pole 22 and the upper pole 26 of the transformer 20 when the center-pole switch 52 ($S_1$) and the upper-pole switch 54 ($S_2$) are switched in substantial unison to maintain these switches in opposing configurations, and the load switch 40 ($S_L$) is open.

Figure 12:
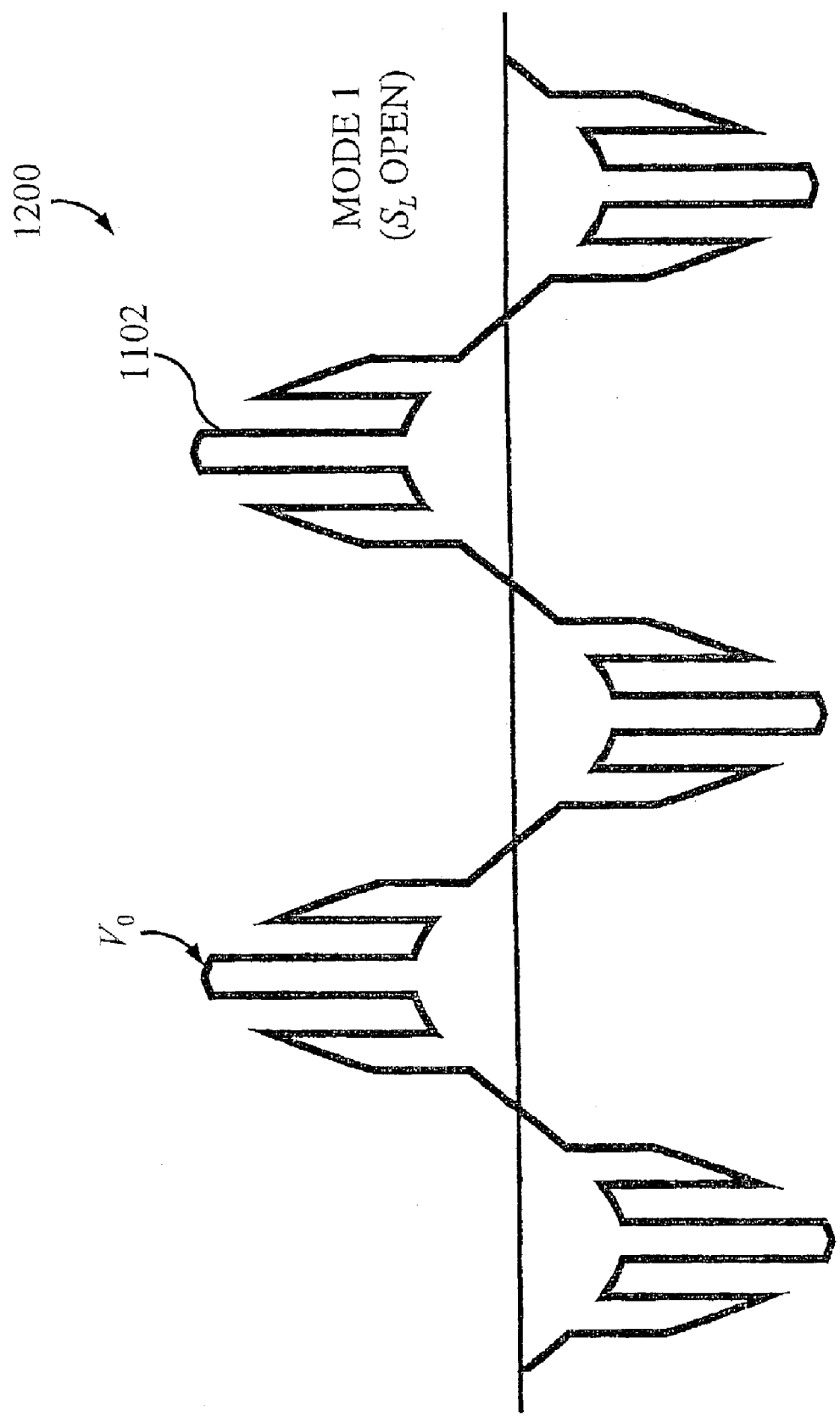
FIG. 12 is a voltage waveform diagram illustrating the no-load switched output voltage in a first operating mode for a voltage sag and over-voltage compensation device, without phantom lines.

As shown in FIG. 11, the switching operation causes the output voltage 1102 ($V_O$) to alternate between the voltage waveforms 802 and 902, which are shown in phantom lines. More specifically, the output voltage 1102 ($V_O$) follows the voltage waveform 802 when the center-pole switch 52 ($S_1$) is switched off and the upper-pole switch 54 ($S_2$) is switched on. Alternatively, the output voltage 1102 ($V_O$) follows the voltage waveform 902 when the center-pole switch 52 ($S_1$) is switched on and the upper-pole switch 54 ($S_2$) is switched off. For clarity, FIG. 12 is a voltage waveform diagram 1200 illustrating the resulting no-load switched output voltage 1102 ($V_O$) in the first operating mode, without phantom lines.

Figure 13:
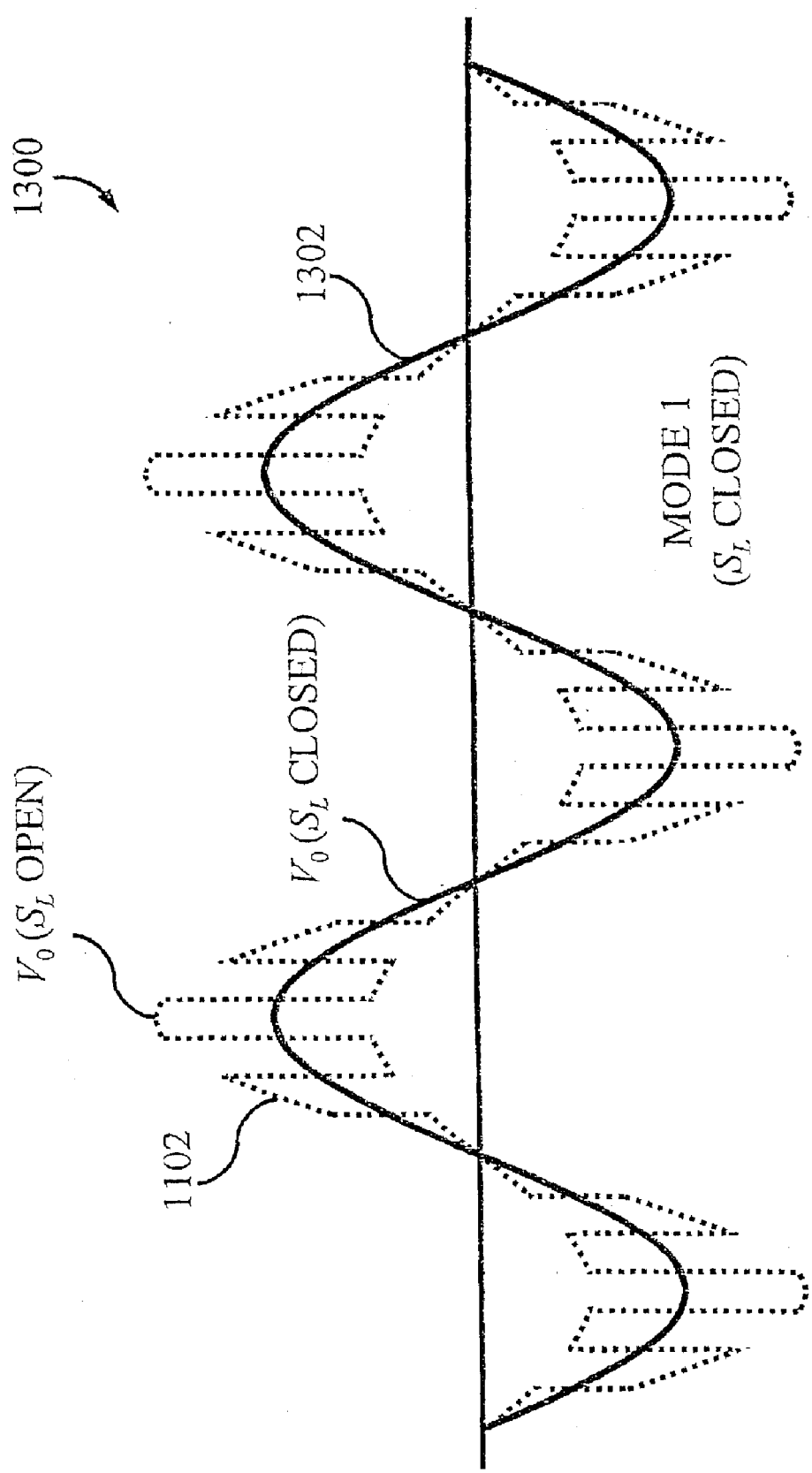
FIG. 13 is a voltage waveform diagram illustrating the load-connected switched output voltage in a first operating mode for a voltage sag and over-voltage compensation device.

FIG. 13 is a voltage waveform 1300 diagram illustrating the load-connected switched output voltage 1302 ($V_O$) for the first operating mode for the voltage compensation device 18. That is, FIG. 13 illustrates the output voltage 1302 ($V_O$) after the load switch 40 ($S_L$) is closed, which brings the filter capacitor 44, the notch filter 46, and the load 14 into the circuit in parallel with the transformer 20. The no-load switched output voltage 1102 ($V_O$) is shown as a phantom line for comparison purposes. As shown in FIG. 13, closing the load switch 40 ($S_L$) drives the output voltage 1302 ($V_O$) toward a one per-unit sinusoidal waveform, representing a compensation for the voltage sag or over-voltage condition occurring in the source voltage 802 ($V_S$). It should be appreciated that filter capacitor 44 carries and smoothes substantially all of the load current in this mode of operation. Those skilled in the art will appreciate that area under the curve 1102 is the same as the area under the curve 1302, which allows the peak level of the output voltage 1302 ($V_O$) to be adjusted by controlling the pulse-width modulation scheme for gating the modulating switches 52, 54.

Figure 14:
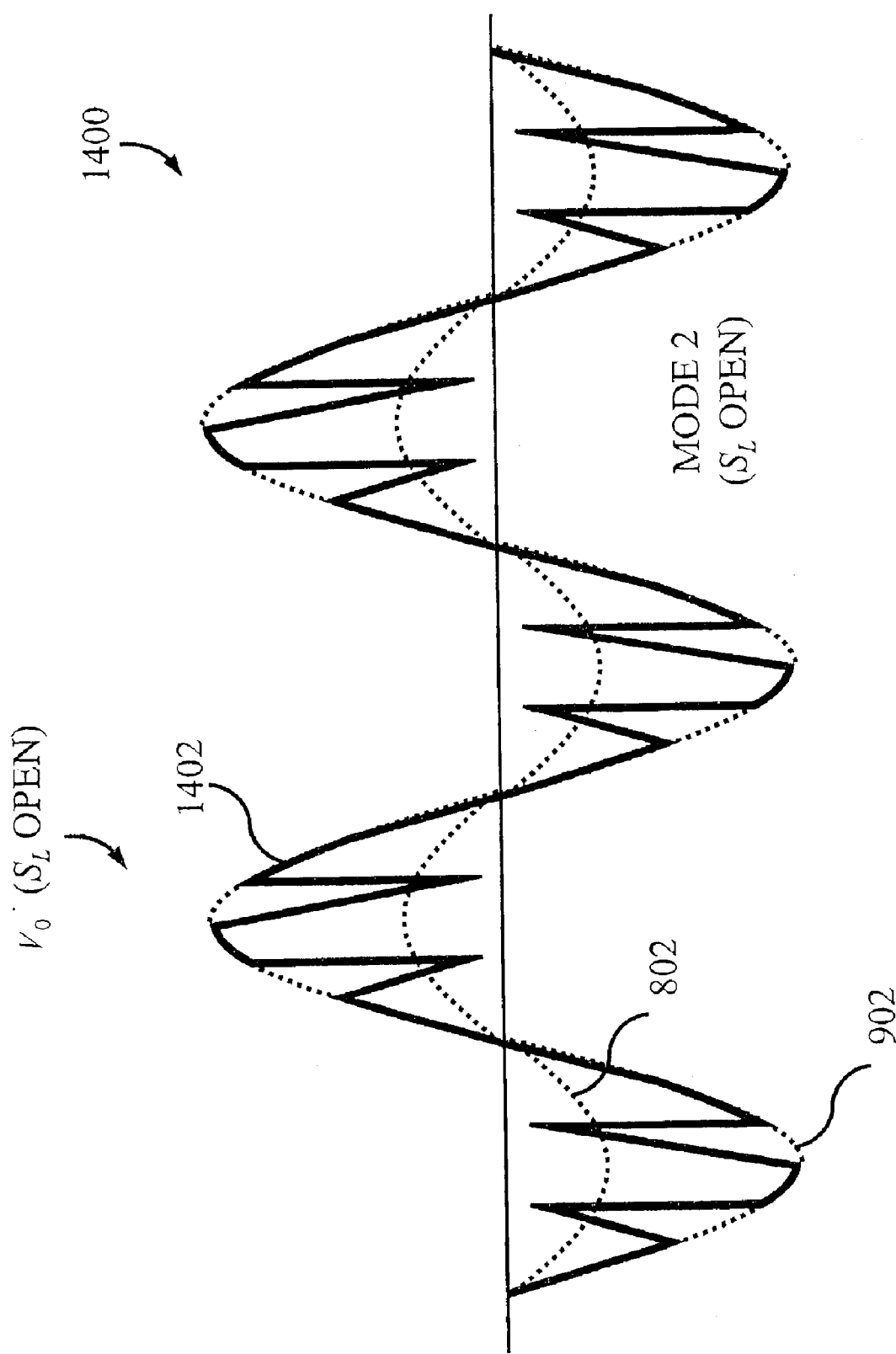
FIG. 14 is a voltage waveform diagram illustrating the no-load switched output voltage in a second operating mode for a voltage sag and over-voltage compensation device, including phantom lines.
Figure 15:
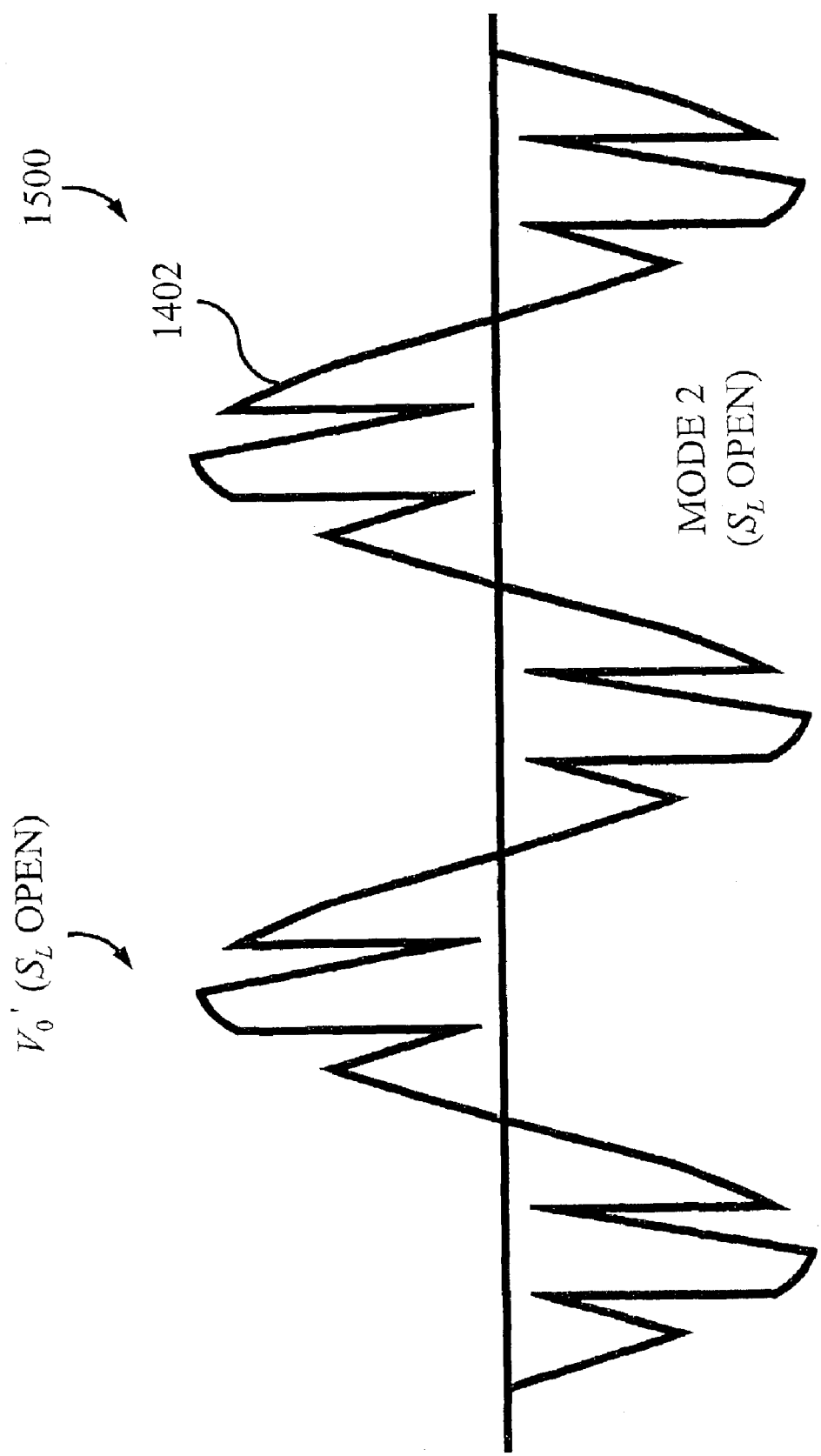
FIG. 15 is a voltage waveform diagram illustrating the no-load switched output voltage in the second operating mode for a voltage sag and over-voltage compensation device, without phantom lines.

FIG. 14 is a voltage waveform diagram 1400 illustrating the no-load switched output voltage 1402 ($V_O$) in a second operating mode for a voltage compensation device 18. This second operating mode corresponds to control routine 700 described previously with reference to FIG. 7. That is, the output voltage 1402 ($V_O$) represents the voltage between the lower pole 22 and the upper pole 26 of the transformer 20 when the upper-pole switch 54 ($S_2$) is held open (i.e., by-pass mode) and the center-pole switch 52 ($S_1$) is gated to produce the desired output voltage ($V_O$). As shown in FIG. 14, the switching operation causes the output voltage 1402 ($V_O$) to alternate between the voltage waveform and 902, which is shown as a phantom line, and a curve ramping toward zero voltage. More specifically, the output voltage 1402 ($V_O$) follows the voltage waveform 902 when the center-pole switch 52 ($S_1$) is switched on, and ramps downward toward zero voltage through the snubber circuit 32 when the center-pole switch 52 ($S_1$) is switched off. Note that the snubber circuit 32 referred to here is on parallel with the modulating switch 34, which are both components of the center-pole switch 52, as shown in FIG. 2. For clarity, FIG. 15 is a voltage waveform diagram 1500 illustrating this no-load switched output voltage 1402 ($V_O$) in the second operating mode, without phantom lines.

Figure 16:
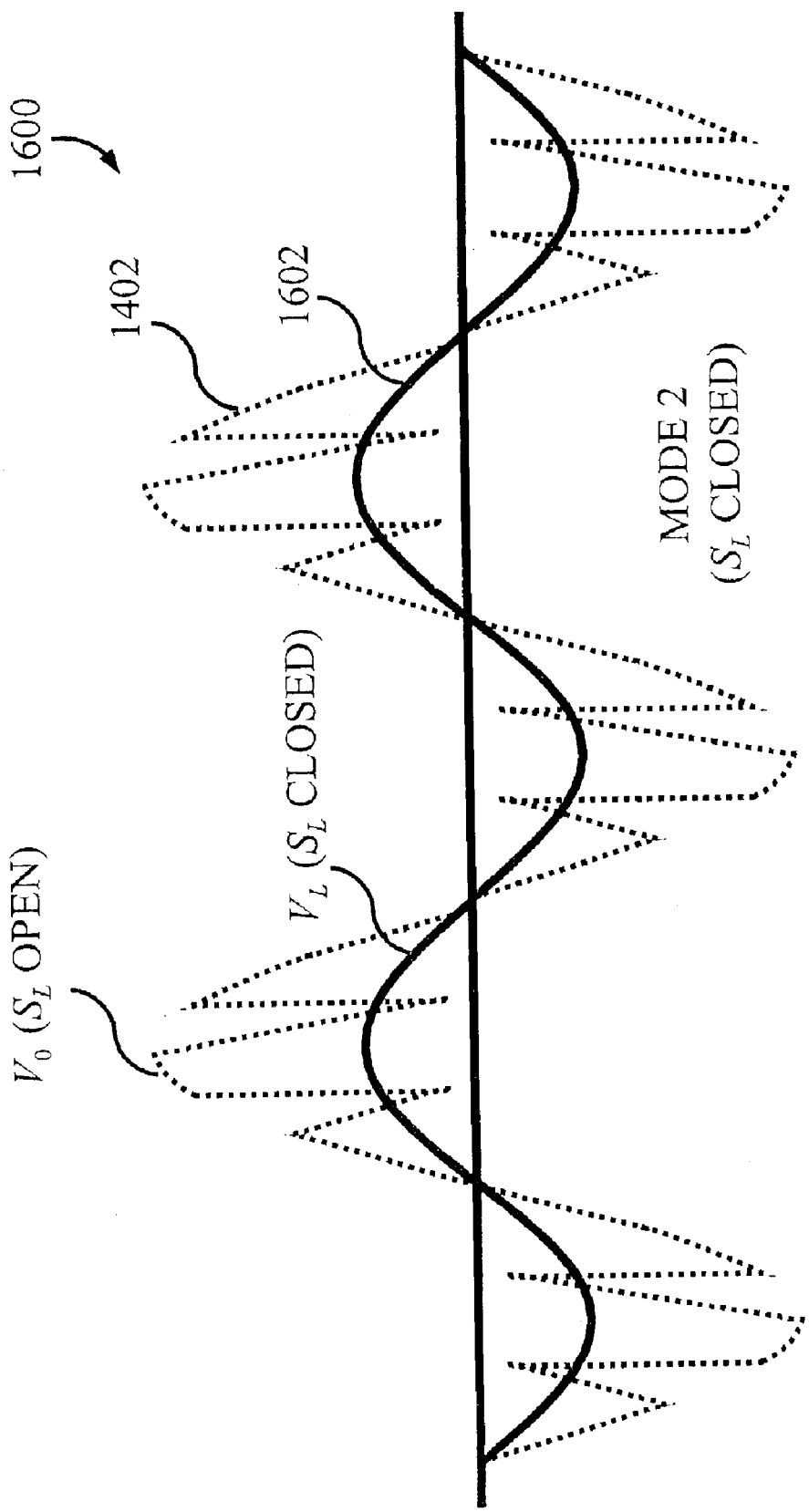
FIG. 16 is a voltage waveform diagram illustrating the load-connected switched output voltage in a second operating mode for a voltage sag and over-voltage compensation device.
Figure 17:
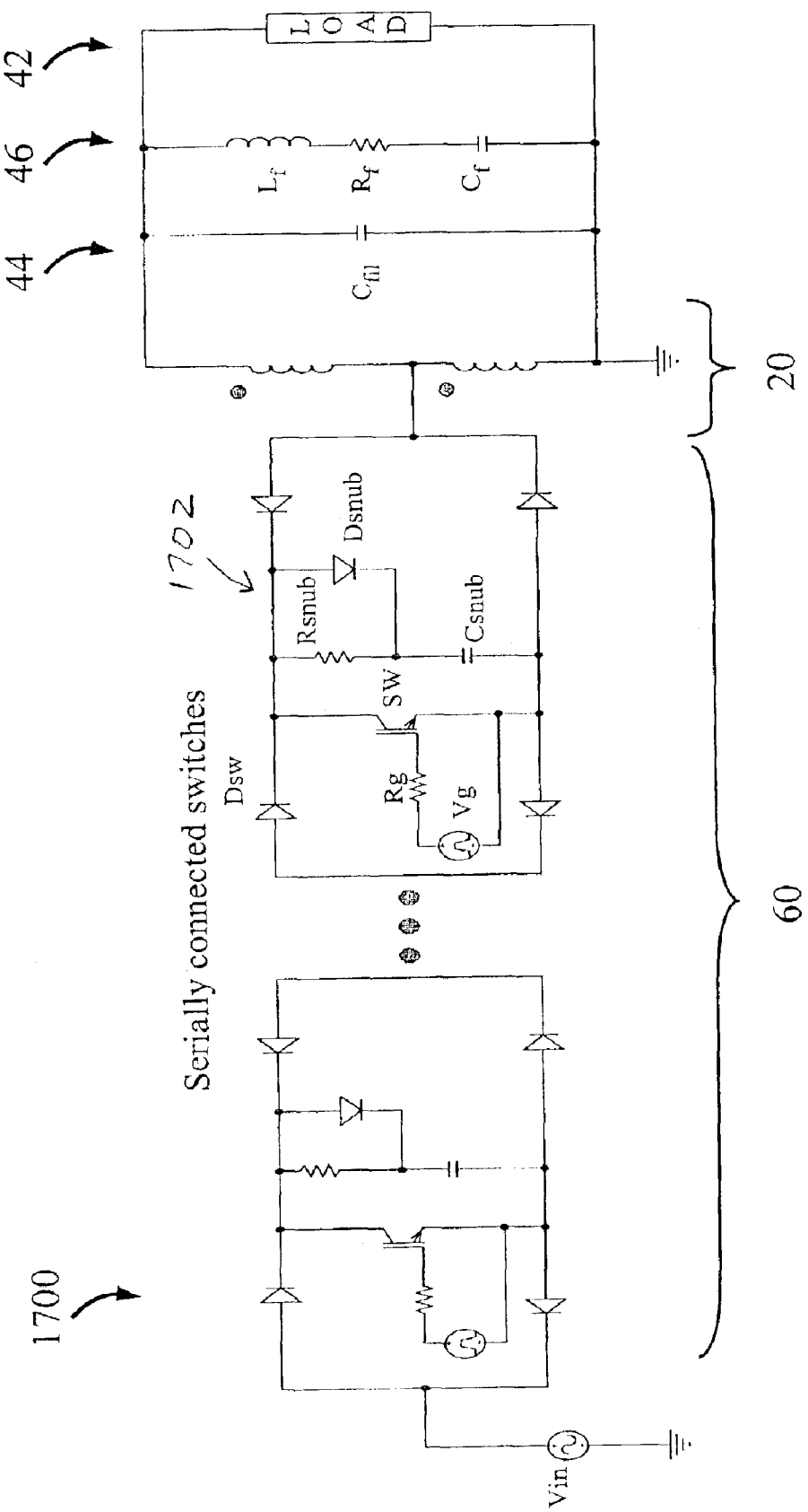
FIG. 17 is an equivalent electric circuit diagram for a voltage sag and over-voltage compensation device suitable for computer modeling of the circuit.

FIG. 16 is a voltage waveform 1600 diagram illustrating the load-connected switched output voltage 1602 ($V_O$) for the second operating mode for the voltage compensation device 18. That is, FIG. 16 illustrates the output voltage 1602 ($V_O$) after the load switch 40 ($S_L$) is closed, which brings the filter capacitor 44, the notch filter 46, and the load 14 into the circuit in parallel with the transformer 20. The no-load switched output voltage 1402 ($V_O$) is shown as a phantom line for comparison purposes. As shown in FIG. 16, closing the load switch 40 ($S_L$) drives the output voltage 1602 ($V_O$) toward a one per-unit sinusoidal waveform, representing a compensation for the voltage sag or over-voltage condition occurring in the source voltage 802 ($V_S$). It should be appreciated that filter capacitor 44 carries and smoothes substantially all of the load current in this mode of operation. Again, those skilled in the art will appreciate that area under the curve 1402 is the same as the area under the curve 1602, which allows the peak level of the output voltage 1602 ($V_O$) to be adjusted by controlling the pulse-width modulation scheme for gating the modulating switch 52.

FIG. 17 is an equivalent electric circuit diagram 1700 for the voltage compensation device 18. The equivalent electric circuit for the cascade switch 30, with the modulating full-bridge rectifiers, are shown on the left of FIG. 17. The equivalent electric circuit for the transformer 20 is shown on the center of FIG. 17. To the right of the transformer 20, from left to right in parallel connection, FIG. 17 shows the equivalent electric circuits for the filter capacitor 44, the notch filter 46, and the load 14. In addition, note that in this particular cirdult the snubber in this circuit 1700 includes a resistor ($R_{snub}$) in series with a capacitor ($C_{snub}$) and a diode in parallel with the snubber resistor ($D_{snub}$).

Figure 18:
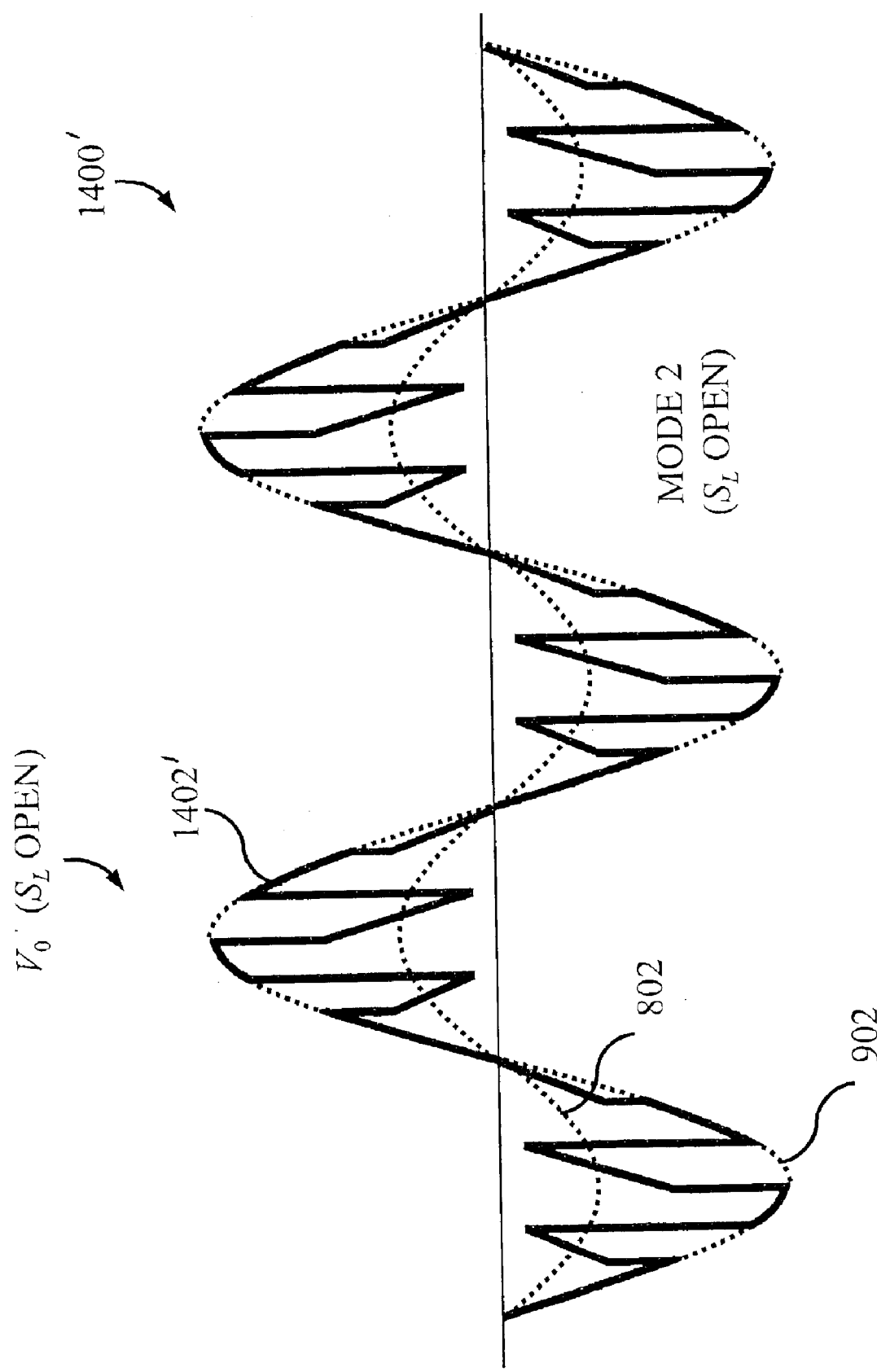
FIG. 18 is a voltage waveform diagram illustrating the no-load switched output voltage in a second operating mode for a voltage sag and over-voltage compensation device with an alternate snubber circuit, including phantom lines.

FIG. 18 is a voltage waveform diagram 1400' illustrating the no-load switched output voltage 1402' ($V_O$) in a second operating mode for a voltage compensation device 18 with an alternate snubber circuit that does not include a diode in parallel with the snubber resistor (see FIG. 21). This second operating mode corresponds to control routine 700 described previously with reference to FIG. 7. That is, the output voltage 1402' ($V_O$) represents the voltage between the lower pole 22 and the upper pole 26 of the transformer 20 when the upper-pole switch 54 ($S_2$) is held open (i.e., by-pass mode) and the center-pole switch 52 ($S_1$) is gated to produce the desired output voltage ($V_O$). As shown in FIG. 18, the switching operation causes the output voltage 1402' ($V_O$) to alternate between the voltage waveform and 902, which is shown as a phantom line, and a curve ramping toward zero voltage. More specifically, the output voltage 1402' ($V_O$) follows the voltage waveform 902 when the center-pole switch 52 ($S_1$) is switched on, and ramps downward toward zero voltage through the alternate snubber circuit when the center-pole switch 52 ($S_1$) is switched off. For clarity, FIG. 19 is a voltage waveform diagram 1500' illustrating this no-load switched output voltage 1402' ($V_O$) in the second operating mode, without phantom lines.

Figure 19:
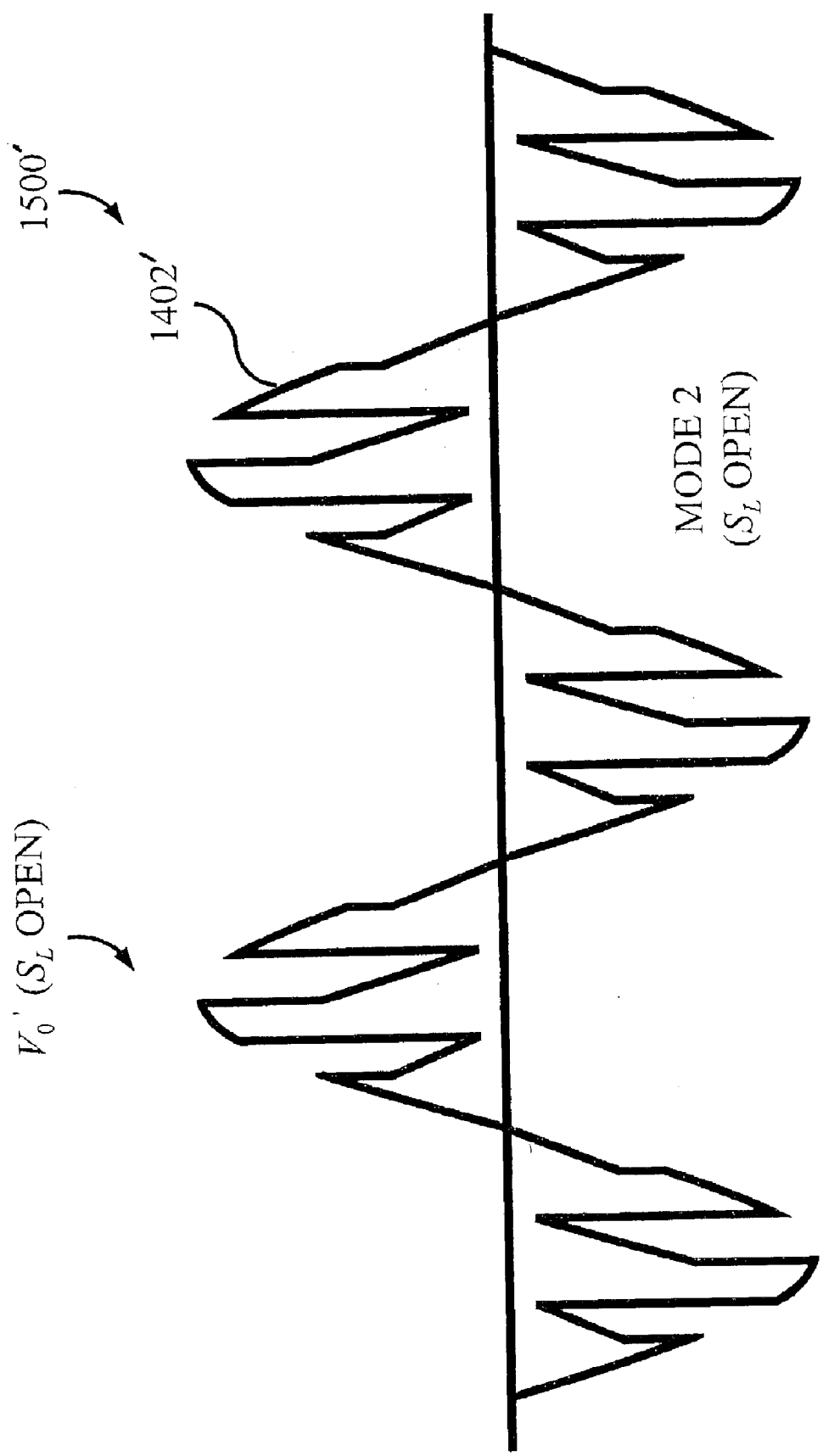
FIG. 19 is a voltage waveform diagram illustrating the no-load switched output voltage in the second operating mode for a voltage sag and over-voltage compensation device with an alternate snubber circuit, without phantom lines.

FIG. 19 is a voltage waveform 1600' diagram illustrating the load-connected switched output voltage 1602' ($V_O$) for the second operating mode for the voltage compensation device 18 with an alternate snubber circuit that does not include a diode in parallel with the snubber resistor (see FIG. 21). That is, FIG. 19 illustrates the output voltage 1602' ($V_O$) after the load switch 40 ($S_L$) is closed, which brings the filter capacitor 44, the notch filter 46, and the load 14 into the circuit in parallel with the transformer 20. The no-load switched output voltage 1402' ($V_O$) is shown as a phantom line for comparison purposes. As shown in FIG. 20, closing the load switch 40 ($S_L$) drives the output voltage 1602 ($V_O$) toward a one per-unit sinusoidal waveform, representing a compensation for the voltage sag or over-voltage condition occurring in the source voltage 802 ($V_S$). It should be appreciated that filter capacitor 44 carries and smoothes substantially all of the load current in this mode of operation. Again, those skilled in the art will appreciate that area under the curve 1402 is the same as the area under the curve 1602, which allows the peak level of the output voltage 1602 ($V_O$) to be adjusted by controlling the pulse-width modulation scheme for gating the modulating switch 52.

FIG. 21 is an equivalent electric circuit diagram 1700' for the voltage compensation device 18. This equivalent electric is the same as the equivalent circuit shown in FIG. 17 except that the snubber 1700' that includes a resistor ($R_{snub}$) in series with a capacitor ($C_{snub}$), and does not include and a diode in parallel with the snubber resistor. This difference in the snubber circuit results in the difference between the wave forms 1402 shown on FIG. 14 and 1402' shown on FIG. 18.

FIG. 22 is a voltage waveform diagram 1800 illustrating the results of a computer simulation using the equivalent electric circuit diagram 1700 used for voltage amplification (i.e., voltage sag compensation). That is, the input voltage 1802 is smaller than the output voltage 1804. FIG. 23 is a voltage waveform diagram 1900 illustrating the results of a computer model of the equivalent electric circuit diagram 1700 used for voltage reduction (i.e., over-voltage compensation). That is, the input voltage 1802 is larger than the output voltage 1804. Those skilled in the art will appreciate that pulse-width modulation scheme for gating the modulating switches 52 and 54 (in the first operation mode, control routine 600) or for gating the modulating switch 52 (in the second operation mode, control routine 700) may be selected to produce an output voltage ($V_O$) that is greater than, or smaller than, the input source voltage 802 ($V_S$), within the operational range of the voltage compensation device 18. It should also be noted that the pulse-width required to produce a desired output voltage from the voltage compensation device 18 is somewhat greater in the second operation mode, control routine 700, as compared to the first operation mode, control routine 600. But the switching devices are less expensive for the second operation mode because the upper-pole switching devices may be less expensive zero-current switching devices, such as thyristors, rather than non-zero-current-switching devices, such as IGBTs. In addition, the upper-pole snubbers may be eliminated or replaced with lower cost voltage dividing circuitry when the upper pole switches can only switch under zero-current conditions.

Figure 24:
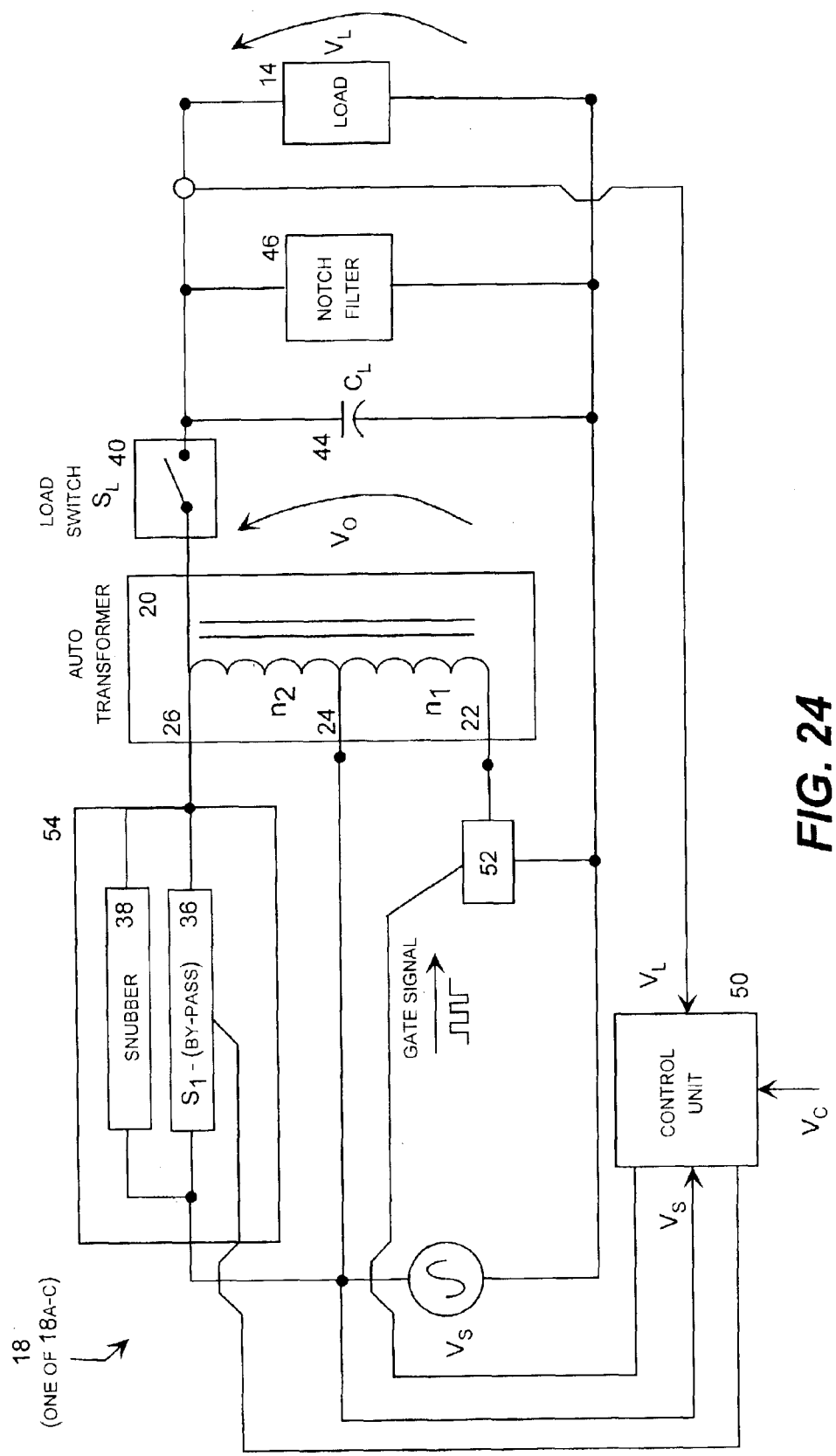
FIG. 24 is an electric circuit diagram of a first alternative configuration for one phase of the three-phase voltage sag and over-voltage compensation device shown in FIG. 1 in which the modulating switch is connected in series with the transformer.

FIG. 24 is an electric circuit diagram of a first alternative configuration for one phase of the three-phase voltage sag and over-voltage compensation device shown in FIG. 1 in which the modulating switch is connected in series with the transformer. This configuration shown in FIG. 24 is substantially the same as the connection shown in FIG. 2, except that the modulating switch 52 is connected in series with the transformer 20. More specifically, the modulating switch 52 is connected between the lower pole 22 of the transformer 20 and the neutral leg of the power source $V_S$. In this configuration, the switching voltage across the modulating switch 52 is the voltage across both windings of the transformer 20, which are connected in series with each other. In the center-pole switching configuration shown in FIG. 2, in comparison, the switching voltage across the modulating switch 52 is the voltage across only one winding of the transformer 20. In other words, the modulating switch 52 is connected in series with both windings of the transformer 20 in the configuration shown in FIG. 24, whereas the modulating switch 52 is connected in parallel with one winding of the transformer 20 in the configuration shown in FIG. 2.

As a result, the modulating configuration shown in FIG. 24, when compared to the center-pole (parallel-connected) configuration shown in FIG. 2, has the advantage of increasing the switching voltage across the modulating switch 52 while decreasing the switching current through the modulating switch, which typically reduces the cost of the modulating switch because higher current switching devices are generally more expensive. For example, when the turns ratio of the transformer is one-to-two (1:2) (i.e., two winding with the same number of turns, or one winding with a center tap), the modulating connection shown in FIG. 24 doubles the switching voltage across the modulating switch 52 and cuts the switching current through the modulating switch 52 in half in comparison to the center-pole switching configuration shown in FIG. 2. Those skilled in the art will appreciate that current and voltage comparisons for switch 52 for the FIG. 2 and FIG. 24 configurations change, in inverse proportions to each other, as the turns ratio of the transformer 20 changes. However, the basic result of decreasing the switching current through the modulating switch 52 while increasing the switching voltage across the modulating switch in inverse proportion remains valid for any selected turns ratio for the transformer.

The modulating configuration shown in FIG. 24 may be operated in the first mode of operation (control routine 600) described with reference to FIG. 6 or in the second mode of operation (control routine 700) described with reference to FIG. 7. Thus, the upper pole switch 54 in the configuration shown in FIG. 24 may be a zero-current switching device, such as thyristor, or a non-zero-current-switching devices, such as and IGBT.

Figure 25:
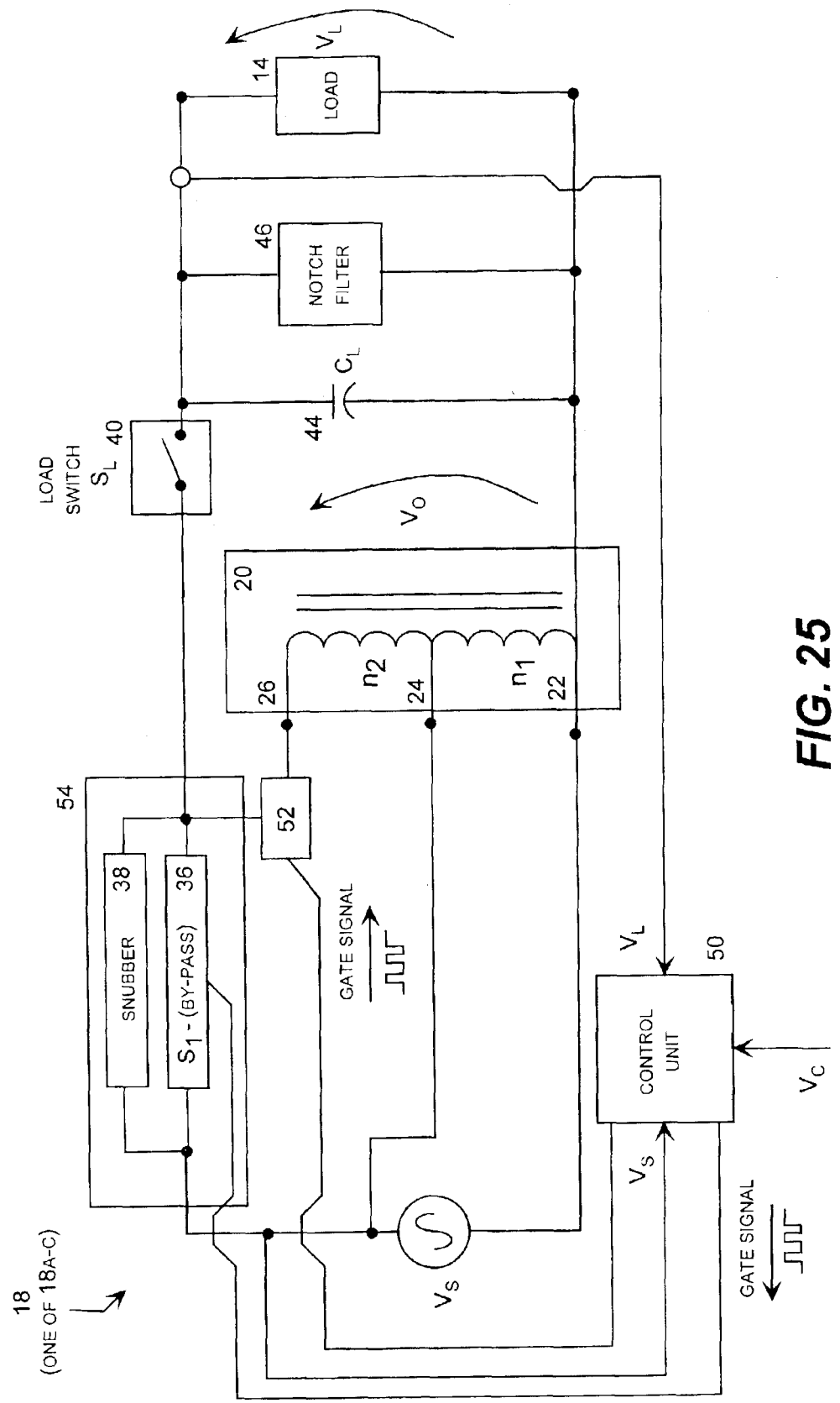
FIG. 25 is an electric circuit diagram of a second alternative configuration for one phase of the three-phase voltage sag and over-voltage compensation device shown in FIG. 1 in which the modulating switch is connected in series with the transformer.

FIG. 25 is an electric circuit diagram of a second alternative configuration for one phase of the three-phase voltage sag and over-voltage compensation device shown in FIG. 1 in which the modulating switch is connected in series with the transformer. This configuration is substantially the same as the configuration shown in FIG. 24 except that the modulating modulating switch 52 is connected between the upper pole 26 of the transformer 20 and the neutral leg of the power source $V_S$ electrically downstream (i.e., toward the load) from the upper pole switch 54. This configuration is operationally similar to the configuration shown in FIG. 24 except that the transformer 20 is at line voltage when the modulating switch 52 is open in the configuration shown in FIG. 25, whereas the transformer 20 is at ground voltage when the modulating switch 52 is open in the configuration shown in FIG. 24. Therefore, the energizing current related losses will be slightly higher in the FIG. 25 configuration.

In addition, the low-voltage pole of the transformer 20 requires high-voltage insulation in the FIG. 24 configuration, which is not usually included with a standard "off the shelf" transformer. However, both sides of the modulating switch 52 require high-voltage insulation in the FIG. 25 configuration, whereas only one side of the modulating switch requires high-voltage insulation in the FIG. 24 configuration. Thus, one configuration or the other may be suitable depending on the type and cost of the equipment available. It should also be noted that, with the exception of the additional insulation required for the low pole of the transformer 20 in the FIG. 24 configuration, the transformer 20 in the FIG. 24 and FIG. 25 configurations may be a standard "off-the-shelf" transformer, which is a design advantage in most circumstances.

Figure 26:
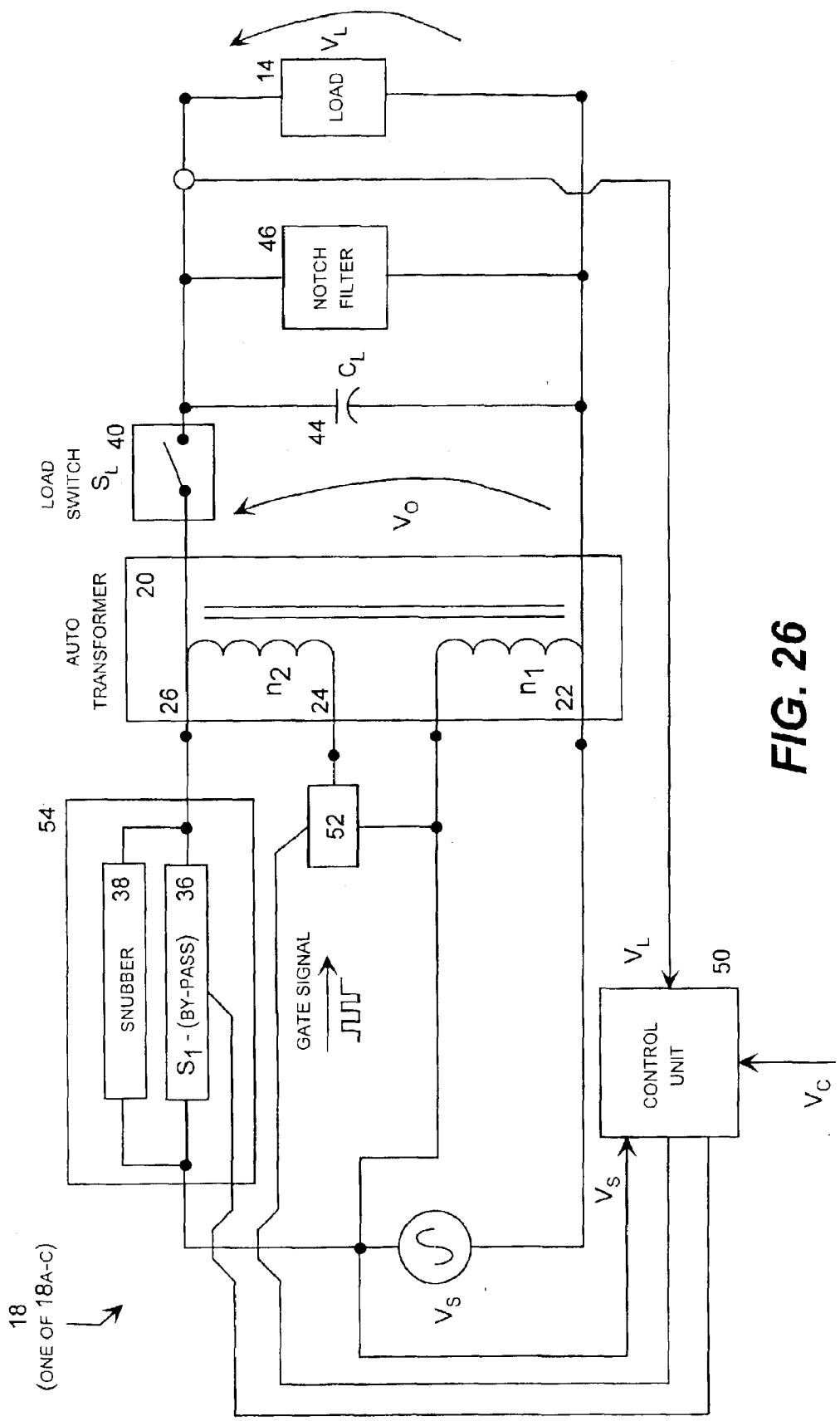
FIG. 26 is an electric circuit diagram of a third alternative configuration for one phase of the three-phase voltage sag and over-voltage compensation device shown in FIG. 1 in which the modulating switch is connected in series with the transformer.

FIG. 26 is an electric circuit diagram of a third alternative configuration for one phase of the three-phase voltage sag and over-voltage compensation device shown in FIG. 1 in which the modulating switch is connected in series with the transformer. This configuration is substantially the same as the configuration shown in FIG. 24 except that the modulating switch 52 is connected in series between the windings n1 and n2 of the transformer 20 with winding n1 connected to the high voltage side of the power source $V_S$. This configuration is operationally similar to the configuration shown in FIG. 24 except that only winding n1 of the transformer 20 is at line voltage when the modulating switch 52 is open in the configuration shown in FIG. 26. Therefore, the energizing current related losses in the FIG. 26 configuration will between those occurring in the FIG. 24 and FIG. 25 configurations. In this configuration, the transformer 20 does not require any insulation other than the standard insulation, and both sides of the modulating switch 52 require high-voltage insulation.

Figure 27:
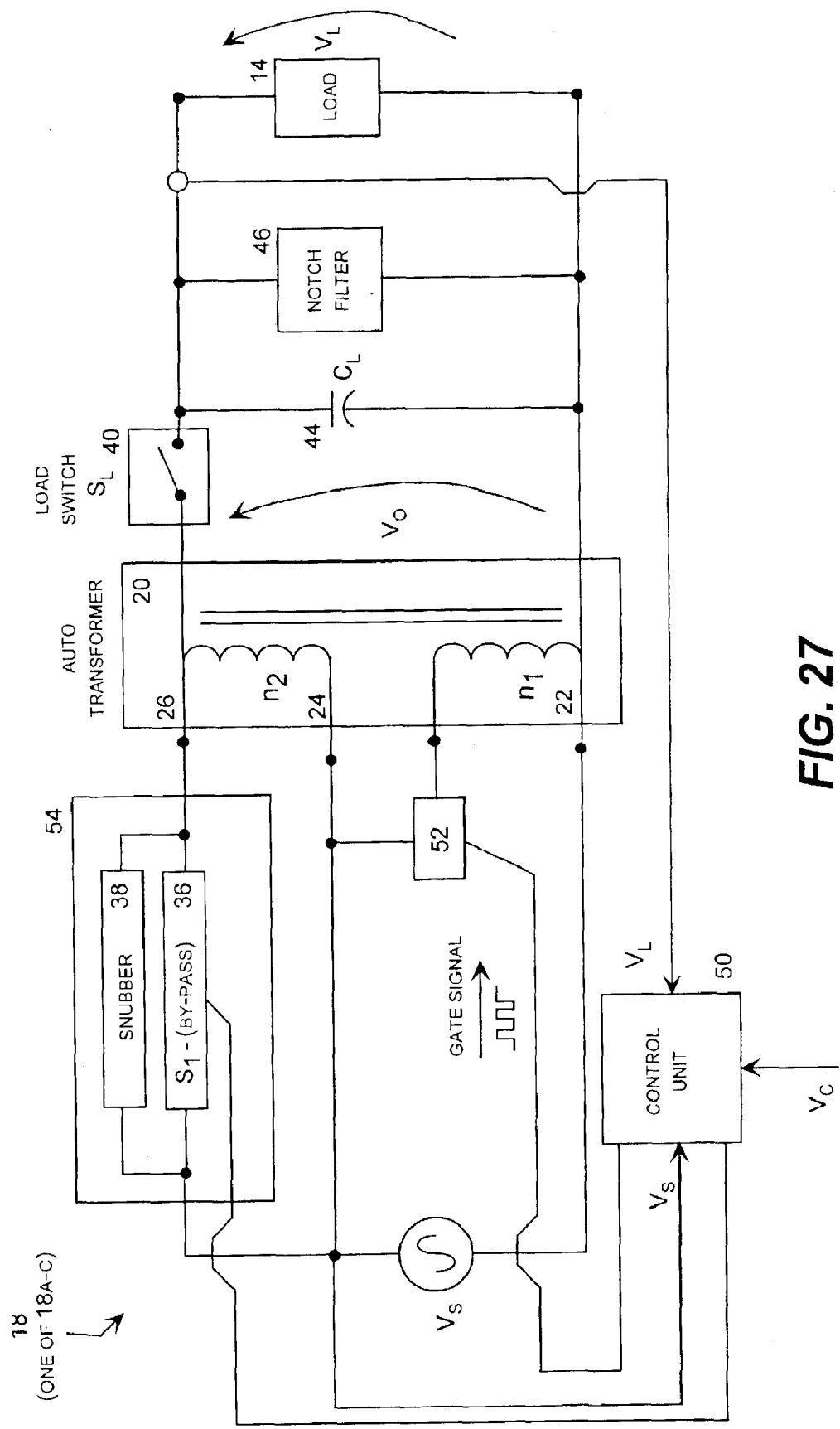
FIG. 27 is an electric circuit diagram of a fourth alternative configuration for one phase of the three-phase voltage sag and over-voltage compensation device shown in FIG. 1 in which the modulating switch is connected in series with the transformer.
Figure 28:
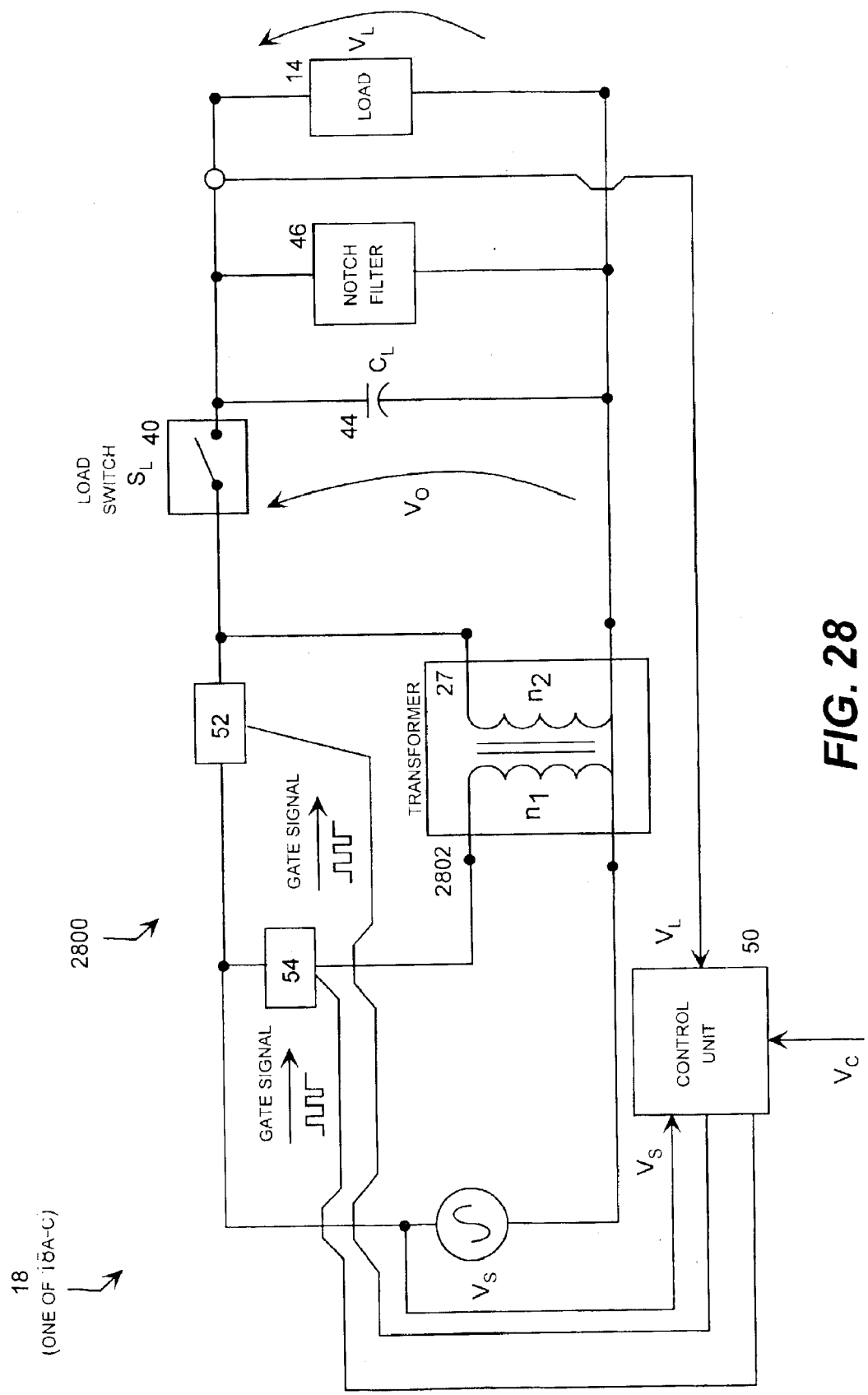
FIG. 28 is an electric circuit diagram of a fifth alternative configuration for one phase of the three-phase voltage sag and over-voltage compensation device using a pulse-width modulated two-winding transformer.

FIG. 27 is an electric circuit diagram of a fourth alternative configuration for one phase of the three-phase voltage sag and over-voltage compensation device shown in FIG. 1 in which the modulating switch is connected in series with the transformer. This configuration is substantially the same as the configuration shown in FIG. 24 except that modulating switch 52 is connected between the windings n1 and n2 of the transformer 20 with winding n2 connected to the high voltage side of the power source $V_S$. This configuration is operationally similar to the configuration shown in FIG. 24 except that only winding n2 of the transformer 20 is at line voltage when the modulating switch 52 is open in the configuration shown in FIG. 26. It should also be noted that the transformer 20 in the FIG. 26 and FIG. 27 configurations may be a standard two-winding transformer connected as shown to create a transformer with a modulating switch.

FIG. 28 is an electric circuit diagram of a fourth alternative configuration 2800 for one phase of the three-phase voltage sag and over-voltage compensation device using a pulse-width modulated two-winding transformer 2802. In this alternative, the normal source voltage $V_S$ is supplied to the load 14 when the modulating switch 54 is open and the bypass switch 52 is closed. To correct for a detected voltage sag, the bypass switch 52 may be held open and the modulating switch 54 may operated to generate a pulse-width modulated output voltages. This corresponds to the "mode 2" operation illustrated in FIG. 15. Alternatively, the modulating switches 52 and 54 may be operated in opposing unison to produce the "mode 1" operation illustrated in FIG. 11.

It should be understood that the foregoing relates only to the exemplary embodiments of the present invention, and that numerous changes may be made therein without departing from the spirit and scope of the invention as defined by the following claims.

The invention claimed is:

1. A device for selectively receiving electric power from an AC power source oscillating at a system frequency, adjusting the voltage of the power, and delivering a corresponding voltage-corrected AC power supply to a connected load; comprising:
    a transformer;
    a modulating switch connected in series with the transformer operable between an open configuration and a closed configuration for selectively connecting the AC power source to the transformer; and
    a control unit operative for:
        in response a voltage sag or over-voltage condition of the AC power source, selectively gating the modulating switch between the open configuration and the closed configuration multiple times per cycle of the system frequency to generate the voltage-corrected AC power supply for delivery to the load, and
        in response to a cessation of the voltage sag or over-voltage condition, discontinuing patina of the modulation switch.

2. The device of claim 1, wherein the modulating switch is located within a full-bridge rectifier circuit.

3. The device of claim 1, further comprising a snubber connected in parallel with the modulating switch.

4. The device of claim 1, further comprising:
    a snubber connected in parallel with the modulating switch; and
    wherein the modulating switch and the snubber are located within a full-bridge rectifier circuit.

5. The device of claim 1, wherein the modulating switch comprises a cascade of individual modulating switch devices operated substantially simultaneously.

6. The device of claim 5, wherein each individual switching device is located within an individual full-bridge rectifier circuit.

7. The device of claim 6, further comprising a plurality of snubber circuits, each connected in parallel with one of the individual switching devices and located within a corresponding full-bridge rectifier circuit.

8. The device of claim 7, wherein each snubber circuit comprises a resistor and a capacitor connected in series and a diode connected in parallel with the resistor.

9. The device of claim 1, further comprising a capacitor connected between the neutral and upper poles and configured to smooth the voltage-corrected AC power supply toward a sinusoidal power supply at the system frequency.

10. The device of claim 1, wherein the control unit gates the modulating switch at a gating frequency, further comprising a notch filter connected between the neutral and upper poles and configured to reduce power disturbances occurring in the voltage-corrected AC power supply within a filter frequency range comprising the gating frequency.

11. The device of claim 10, wherein the notch filter comprises an inductor, a resistor and a capacitor connected in series.

12. The device of claim 1, further comprising an upper-pole switch for selectively connecting the AC power source between the neutral and upper poles when the upper-pole switch is gated to a closed configuration, and for selectively disconnecting the AC power source from connection between the neutral and upper poles when the upper-pole switch is gated to an open configuration.

13. The device of claim 12, further comprising an upper-pole snubber connected in parallel with the upper-pole switch.

14. The device of claim 12, wherein the upper-pole switch comprises a cascade of individual upper-pole switching devices connected in series and operated substantially simultaneously.

15. The device of claim 14, wherein each individual upper-pole switching device is located within an individual full-bridge rectifier circuit.

16. The device of claim 15, further comprising a plurality of upper-pole snubber circuits, each connected in parallel with one of the individual switching devices and located within a corresponding full-bridge rectifier circuit.

17. The device of claim 16, wherein each upper-pole snubber circuit comprises a resistor and a capacitor connected in series and a diode connected in parallel with the resistor.

18. The device of claim 12, wherein the control unit is configured for gating the upper-pole and switching devices in substantial unison to maintain said switches in opposing configurations.

19. The device of claim 12, wherein the control unit is configured for:
   detecting a voltage sag or over-voltage condition in the AC power source;
   in response to detecting the voltage sag or over-voltage condition, continually gating the upper-pole and the modulating switches in substantial unison to maintain said switches in opposing configurations to create a desired voltage-corrected AC power supply;
   detecting a cessation of the voltage sag or over-voltage condition in the AC power source;
   in response to detecting the cessation of the voltage sag or over-voltage condition, gating the modulating switch to an open configuration, gating the upper-pole switch to a closed configuration, and discontinuing further gating of the switching device.

20. The device of claim 12, wherein the control unit is configured for:
   detecting a voltage sag or over-voltage condition in the AC power source;
   in response to detecting the voltage sag or over-voltage condition, gating the upper-pole switch to an open configuration;
   while the upper-pole switch is in the open configuration, continually gating the modulating switch between the open and closed configurations to create a desired voltage-corrected AC power supply;
   detecting a cessation of the voltage sag or over-voltage condition in the AC power source; and
   in response to detecting the cessation of the voltage sag or over-voltage condition, gating the modulating switch to an open configuration, gating the upper-pole switch to a closed configuration, and discontinuing further gating of the switching device.

21. A device for selectively receiving electric power from an AC power source oscillating at a system frequency, adjusting the voltage of the power, and delivering a corresponding voltage-corrected AC power supply to a connected load; comprising:
   a transformer;
   a cascade of series connected full-bridge rectifier circuits connected between the AC power source and the center pole;
   a plurality of switching devices, each located within a corresponding full-bridge rectifier circuit, for selectively connecting the AC power source between the neutral and center poles when the switching devices are gated to a closed configuration, and for selectively disconnecting the AC power source from connection between the neutral and center poles when the switching devices are gated to an open configuration; and
   a control unit operative for:
      in response a voltage sag or over-voltage condition of the AC power source, selectively gating the switching devices between the open configuration and the closed configuration multiple times per cycle of the system frequency to generate the voltage-corrected AC power supply for delivery to the load, and
      in response to a cessation of the voltage sag or over-voltage condition, discontinuing gating of the switching devices.

22. The device of claim 21, further comprising:
   a plurality of snubber circuits, each connected in parallel with a corresponding switching device; and
   each switching device and each corresponding snubber circuit located within a corresponding full-bridge rectifier circuit connected between the AC power source and the center pole.

23. The device of claim 22, wherein each snubber circuit comprises a resistor and a capacitor connected in series and a diode connected in parallel with the resistor.

24. The device of claim 23, further comprising a capacitor connected between the neutral and upper poles and configured to smooth the voltage-corrected AC power supply toward a sinusoidal power supply at the system frequency.

25. The device of claim 24, wherein the control unit gates the switching device at a gating frequency, further comprising a notch filter connected between the neutral and upper poles and configured to reduce power disturbances occurring in the voltage-corrected AC power supply in a filter frequency range comprising the gating frequency.

26. The device of claim 25, wherein the notch filter comprises an inductor, a resistor and a capacitor connected in series.

27. The device of claim 25, further comprising a plurality of upper-pole switching devices, each located within a corresponding full-bridge rectifier circuit, for selectively connecting the AC power source between the neutral and upper poles when the upper-pole switching devices are gated to a closed configuration, and for selectively disconnecting the AC power source when the upper-pole switching devices are gated to an open configuration.

28. The device of claim 27, further comprising:
   a plurality of upper-pole snubber circuits, each connected in parallel with a corresponding upper-pole switching device; and
   each upper-pole switching device and each corresponding upper-pole snubber circuit located within a corresponding full-bridge rectifier circuit connected between the AC power source and the upper pole.

29. The device of claim 28, wherein the control unit is configured for gating the upper-pole and switching devices in substantial unison to maintain said switches in opposing configurations.

30. The device of claim 28, wherein the control unit is configured for:
   detecting a voltage sag or over-voltage condition in the AC power source;
   in response to detecting the voltage sag or over-voltage condition, continually gating the upper-pole and switching devices in substantial unison to maintain said switches in opposing configurations to create a desired voltage-corrected AC power supply;
   detecting a cessation of the voltage sag or over-voltage condition in the AC power source;
   in response to detecting the cessation of the voltage sag or over-voltage condition, gating the switching device to an open configuration, gating the upper-pole switching device to a closed configuration, and discontinuing further gating of the switching device.

31. The device of claim 28, wherein the control unit is configured for:
   detecting a voltage sag or over-voltage condition in the AC power source;
   in response to detecting the voltage sag or over-voltage condition, gating the upper-pole switching device to an open configuration;
   while the upper-pole switching device is in the open configuration, continually gating the switching device between the open and closed configurations to create a desired voltage-corrected AC power supply;
   detecting a cessation of the voltage sag or over-voltage condition in the AC power source; and
   in response to detecting the cessation of the voltage sag or over-voltage condition, gating the switching device to an open configuration, gating the upper-pole switching device to a closed configuration, and discontinuing further gating of the switching device.

32. A device for selectively receiving electric power from an AC power source oscillating at a system frequency, adjusting the voltage of the power, and delivering a corresponding voltage-corrected AC power supply to a connected load; comprising:
   a transformer having:
      a first winding around a flux linking core and connected between a neutral pole and a center pole;
      a second winding around the flux linking core and connected between a center pole and an upper pole;
   a cascade of series connected full-bridge rectifier circuits connected between the AC power source and the center pole;
   a plurality of switching devices, each located within a corresponding full-bridge rectifier circuit, for selectively connecting the AC power source between the neutral and center poles when the switching devices are gated to a closed configuration, and for selectively disconnecting the AC power source from connection between the neutral and center poles when the switching devices are gated to an open configuration;
   a plurality of snubber circuits, each connected in parallel with a corresponding switching device, and each switching device and each corresponding snubber circuit located within a corresponding full-bridge rectifier circuit connected between the AC power source and the center pole;
   a plurality of upper-pole switching devices, each located within a corresponding full-bridge rectifier circuit, for selectively connecting the AC power source between the neutral and upper poles when the upper-pole switching devices are gated to a closed configuration, and for selectively disconnecting the AC power source from connection between the neutral and upper poles when the upper-pole switching devices are gated to an open configuration;
   a plurality of upper-pole snubber circuits, each connected in parallel with a corresponding upper-pole switching device, and each upper-pole switching device and each corresponding upper-pole snubber circuit located within a corresponding full-bridge rectifier circuit connected between the AC power source and the upper pole;
   a capacitor connected between the neutral and upper poles and configured to smooth the voltage-corrected AC power supply toward a sinusoidal power supply at the system frequency;
   a control unit operative for:
      in response a voltage sag or over-voltage condition of the AC power source, selectively gating the switching devices between the open configuration and the closed configuration multiple times per cycle of the system frequency to generate the voltage-corrected AC power supply for delivery to the load, and
      in response to a cessation of the voltage sea or over-voltage condition, discontinuing patina of the switching devices; and
   a notch filter connected between the neutral and upper poles and configured to reduce power disturbances occurring in the voltage-corrected AC power supply in a filter frequency range comprising the gating frequency.

* * * * *